US012749988B2

(12) United States Patent
Lai et al.

(10) Patent No.: US 12,749,988 B2
(45) Date of Patent: Sep. 29, 2026

(54) CONVERSION SYSTEM AND CONVERSION METHOD

(71) Applicants: Chicony Power Technology Co., Ltd., New Taipei City (TW); National Taipei University of Technology, Taipei (TW)

(72) Inventors: Yen-Shin Lai, Taipei City (TW); Hung-Wen Cheng, New Taipei City (TW); Tso-Jen Peng, New Taipei City (TW); Ssu-Hao Wang, New Taipei City (TW)

(73) Assignees: CHICONY POWER TECHNOLOGY CO., LTD., New Taipei City (TW); NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 130 days.

(21) Appl. No.: 18/959,961

(22) Filed: Nov. 26, 2024

(65) Prior Publication Data

US 2026/0081537 A1 Mar. 19, 2026

(30) Foreign Application Priority Data

Sep. 13, 2024 (TW) ................................ 113134996

(51) Int. Cl.
*H02M 7/219* (2006.01)
*H02M 1/00* (2006.01)

(52) U.S. Cl.
CPC ......... *H02M 7/219* (2013.01); *H02M 1/0009* (2021.05); *H02M 1/0022* (2021.05); *H02M 1/0025* (2021.05)

(58) Field of Classification Search
CPC .. H02M 7/219; H02M 1/0022; H02M 1/0009; H02M 1/0025
(Continued)

(56) References Cited

U.S. PATENT DOCUMENTS 8,605,464 B2 12/2013 Sase et al.
2014/0063867 A1 3/2014 Djenguerian et al.
(Continued)

FOREIGN PATENT DOCUMENTS

CN 113872455 A 12/2021
CN 117254705 A 12/2023
(Continued)

*Primary Examiner* — Tomi Skibinski
(74) *Attorney, Agent, or Firm* — Birch, Stewart, Kolasch & Birch, LLP

(57) ABSTRACT

A conversion system and a conversion method are provided. The conversion method is applicable to the conversion system, and the conversion system includes a conversion unit and a control unit. The conversion unit includes a first bridge arm, a second bridge arm, an input inductance element, a main capacitor element, a magnetizing inductance element, and a voltage transformation element. The conversion method includes: generating, by the control unit, a first duty cycle based on an output voltage of the conversion unit; controlling, based on the first duty cycle, the first switch and the second switch to be simultaneously turned on in an interval within a switching interval; and prolonging turn-on of one of the first switch and the second switch according to a polarity of an input voltage until a stop condition is met.

20 Claims, 35 Drawing Sheets

(58) Field of Classification Search
USPC .............................................................. 363/89
See application file for complete search history.

(56) References Cited

U.S. PATENT DOCUMENTS

| | | | | |
|---|---|---|---|---|
| 2014/0307486 | A1 | 10/2014 | Huang et al. | |
| 2015/0288286 | A1 | 10/2015 | Chu | |
| 2016/0124029 | A1 | 5/2016 | Gobbi et al. | |
| 2017/0033697 | A1 | 2/2017 | Xu | |
| 2017/0075289 | A1 | 3/2017 | Shimura | |
| 2017/0222572 | A1 | 8/2017 | Yamakawa et al. | |
| 2021/0336533 | A1 | 10/2021 | Benabdelaziz et al. | |
| 2022/0158561 | A1 | 5/2022 | Lind | |
| 2022/0255453 | A1 | 8/2022 | Nakata et al. | |
| 2022/0320887 | A1 | 10/2022 | Liu | |
| 2022/0399879 | A1 | 12/2022 | Yao et al. | |
| 2023/0074505 | A1 * | 3/2023 | Hague ..................... | H02M 1/08 |

FOREIGN PATENT DOCUMENTS

| | | | |
|---|---|---|---|
| JP | 2011-244583 | A | 12/2011 |
| JP | 2013-158122 | A | 8/2013 |
| JP | 2022-62337 | A | 4/2022 |
| JP | 7543961 | B2 | 9/2024 |
| TV | 201322594 | A | 6/2013 |
| TW | 201611492 | A | 3/2016 |
| TW | 201720040 | A | 6/2017 |
| TW | 201828578 | A | 8/2018 |
| TW | 202213919 | A | 4/2022 |
| TW | 202416648 | A | 4/2024 |

* cited by examiner

CONVERSION SYSTEM AND CONVERSION METHOD

CROSS-REFERENCE TO RELATED APPLICATION

This non-provisional application claims priority under 35 U.S.C. § 119(a) to Patent Application No. 113134996 filed in Taiwan, R.O.C. on Sep. 13, 2024, the entire contents of which are hereby incorporated by reference.

BACKGROUND

Technical Field

The present invention relates to a voltage conversion system and a voltage conversion method, and in particular, to a voltage conversion system and a voltage conversion method that convert a voltage by controlling on and off of switches.

Related Art

In an energy conversion system, the conversion efficiency of a power supply is an important issue. However, the consideration of the conversion efficiency of the power supply also involves the complexity of a circuit, and costs can be reduced by a simpler circuit architecture. In addition, in a conventional single-stage isolated bridgeless alternating current-direct current converter, switches on upper and lower sides of a circuit fast arm are simultaneously turned on or off, and one of the switches in an interval in which an input inductor leaks magnetism results in a large efficiency loss.

SUMMARY

In view of this, some embodiments of the present invention provide a conversion system and a conversion method, to resolve the existing technical problem.

Some embodiments of the present invention provide a conversion system. The conversion system includes a conversion unit. The conversion unit includes a first bridge arm, a second bridge arm, an input inductance element, a main capacitor element, a magnetizing inductance element, and a voltage transformation element. The first bridge arm includes a first switch and a second switch that are connected in series in a same direction. The second bridge arm includes a first conduction element and a second conduction element that are connected in series in a same direction, where the second bridge arm is connected in parallel to the first bridge arm. The input inductance element is coupled to a first center point of the first bridge arm, where the input inductance element and a second center point of the second bridge arm are configured to be coupled to a power supply. The main capacitor element and the magnetizing inductance element are connected in series and connected in parallel to the second bridge arm. A primary side of the voltage transformation element is connected in parallel to the magnetizing inductance element.

Some embodiments of the present invention provide a conversion system, further including a control unit. The control unit is configured to perform the following steps: generating a first duty cycle based on an output voltage of the conversion unit; controlling, based on the first duty cycle, the first switch and the second switch to be simultaneously turned on in an interval within a switching interval;

and prolonging turn-on of one of the first switch and the second switch according to a polarity of an input voltage generated by the power supply until a stop condition is met.

Some embodiments of the present invention provide a conversion system. The step of prolonging turn-on of one of the first switch and the second switch according to a polarity of an input voltage generated by the power supply until a stop condition is met includes: calculating, by a second duty cycle calculation unit, a second duty cycle based on the first duty cycle, the input voltage received by the input inductance element and the second center point, the output voltage, a main capacitor voltage on the main capacitor element, and a turns ratio of the voltage transformation element; and executing, by a switch control unit: prolonging the turn-on of the first switch in response to the input voltage being in a positive half cycle until a prolonged turn-on time is equal to the second duty cycle multiplied by a switching cycle; and prolonging the turn-on of the second switch in response to the input voltage being in a negative half cycle until the prolonged turn-on time is equal to the second duty cycle multiplied by the switching cycle.

Some embodiments of the present invention provide a conversion system. The calculating a second duty cycle includes: calculating a first product of the first duty cycle and an absolute value of the input voltage; calculating a sum of the main capacitor voltage, a second product of the output voltage and the turns ratio of the voltage transformation element, and a negative value of the absolute value of the input voltage; and dividing the first product by the sum to obtain the second duty cycle.

Some embodiments of the present invention provide a conversion method, applicable to a conversion system. The conversion system includes a conversion unit and a control unit. The conversion unit includes a first bridge arm, a second bridge arm, an input inductance element, a main capacitor element, a magnetizing inductance element, and a voltage transformation element. The first bridge arm includes a first switch and a second switch that are connected in series in a same direction. The second bridge arm includes a first conduction element and a second conduction element that are connected in series in a same direction, where the second bridge arm is connected in parallel to the first bridge arm. The input inductance element is coupled to a first center point of the first bridge arm, where the input inductance element and a second center point of the second bridge arm are configured to be coupled to a power supply. The main capacitor element and the magnetizing inductance element are connected in series and connected in parallel to the second bridge arm. A primary side of the voltage transformation element is connected in parallel to the magnetizing inductance element. The conversion method includes: generating, by the control unit, a first duty cycle based on an output voltage of the conversion unit; controlling, based on the first duty cycle, the first switch and the second switch to be simultaneously turned on in an interval within a switching interval; and prolonging turn-on of one of the first switch and the second switch according to a polarity of an input voltage generated by the power supply until a stop condition is met.

Some embodiments of the present invention provide a conversion method. The step of prolonging turn-on of one of the first switch and the second switch according to a polarity of an input voltage generated by the power supply until a stop condition is met includes: calculating, by a second duty cycle calculation unit, a second duty cycle based on the first duty cycle, the input voltage received by the input inductance element and the second center point, the output voltage, a main capacitor voltage on the main capacitor element, and a turns ratio of the voltage transformation element; and executing, by a switch control unit: prolonging the turn-on of the first switch in response to the input voltage being in a positive half cycle until a prolonged turn-on time is equal to the second duty cycle multiplied by a switching cycle; and prolonging the turn-on of the second switch in response to the input voltage being in a negative half cycle until the prolonged turn-on time is equal to the second duty cycle multiplied by the switching cycle.

Some embodiments of the present invention provide a conversion method. The calculating a second duty cycle includes: calculating a first product of the first duty cycle and an absolute value of the input voltage; calculating a sum of the main capacitor voltage, a second product of the output voltage and the turns ratio of the voltage transformation element, and a negative value of the absolute value of the input voltage; and dividing the first product by the sum to obtain the second duty cycle.

Based on the above, in the conversion system provided in some embodiments of the present invention, due to the use of a single-stage bridgeless architecture for directly processing an alternating current input voltage by the first bridge arm and the second bridge arm, the conversion system has advantages such as a simple circuit structure and high conversion efficiency. According to the conversion system and the conversion method provided in some embodiments of the present invention, the maximum efficiency is improved and the temperature of the switch is reduced due to the use of the turn-on prolonging technology.

DETAILED DESCRIPTION

Figure 1:
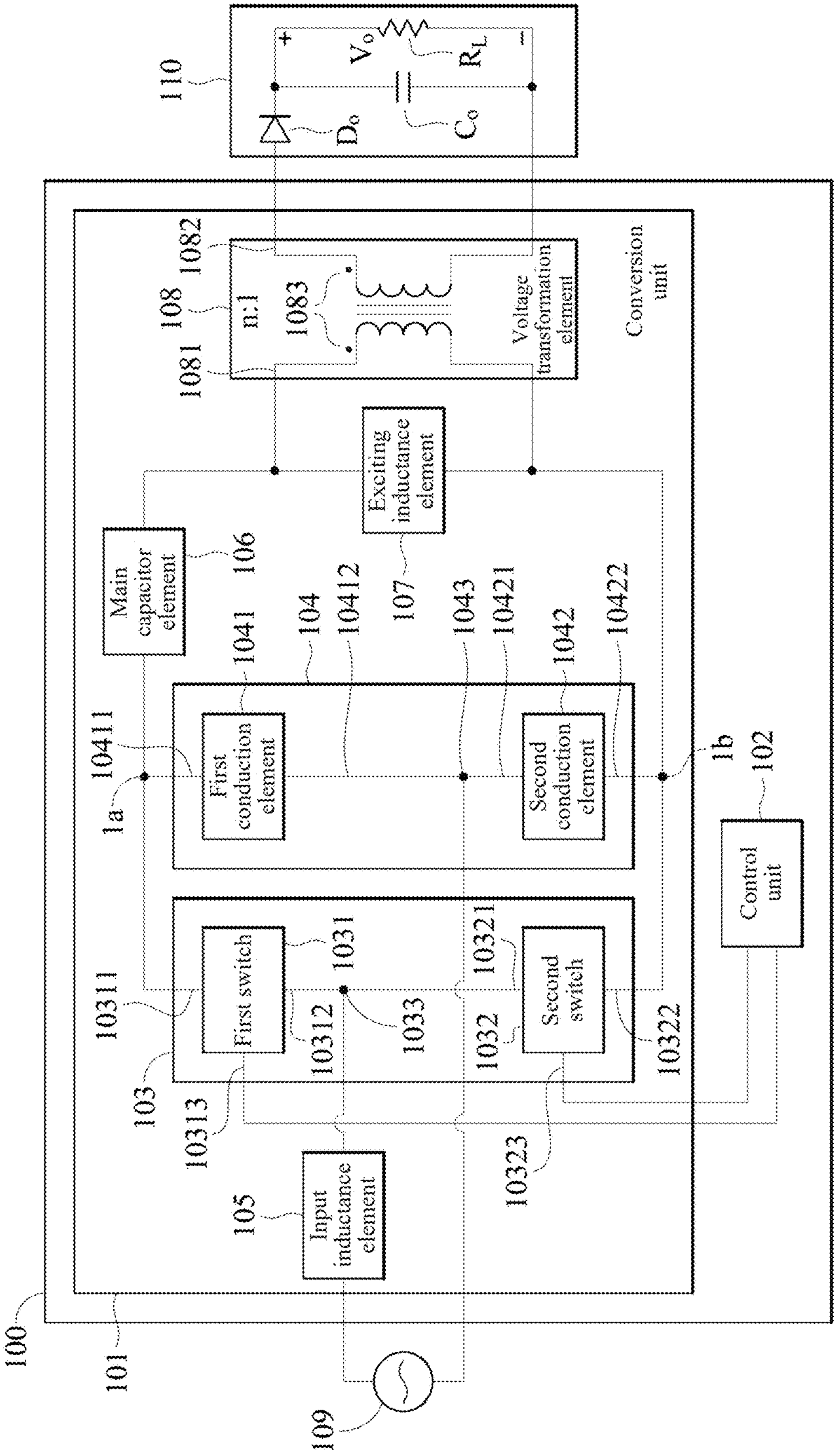
FIG. 1 is a block diagram of a conversion system according to an embodiment of the present invention.

The foregoing and other technical contents, features, and effects of the present invention will be clearly presented in the following detailed description of embodiments with reference to the accompanying drawings. A thicknesses or a size of each element in the accompanying drawings is shown in an exaggerated or omitted or schematic manner for a person skilled in the art to understand and read. In addition, the size of each element are not completely actual size thereof, and are not intended to limit the limiting conditions under which the present invention can be implemented, and therefore are not of essential technical significance. Any structural modification, proportional relationship change, or size adjustment without affecting the effects that can be produced and the objectives that can be achieved by the present invention shall still fall within the scope covered by the technical content disclosed in the present invention. The same reference numerals in all the accompanying drawings are used to represent the same or similar elements. The term "coupled" mentioned in the following embodiments may refer to any direct or indirect connection manner.

FIG. 1 is a block diagram of a conversion system according to an embodiment of the present invention. Referring to FIG. 1, the conversion system 100 includes a conversion unit 101. The conversion unit 101 includes a first bridge arm 103, a second bridge arm 104, an input inductance element 105, a main capacitor element 106, a magnetizing inductance element 107, and a voltage transformation element 108. The first bridge arm 103 includes a first switch 1031 and a second switch 1032 that are connected in series in a same direction. The second bridge arm 104 includes a first conduction element 1041 and a second conduction element 1042 that are connected in series in a same direction, where the second bridge arm 104 and the first bridge arm 103 are connected in parallel between a first parallel point 1*a* and a second parallel point 1*b*.

The first switch 1031 includes a first end 10311, a second end 10312, and a third end 10313, and the second switch 1032 includes a first end 10321, a second end 10322, and a third end 10323. The first end 10311 of the first switch 1031 is coupled to the first parallel point 1*a*, and the second end 10312 of the first switch 1031 is coupled to a first center point 1033 of the first bridge arm 103. The first end 10321 of the second switch 1032 is coupled to the first center point 1033 of the first bridge arm 103, and the first end 10321 of the second switch 1032 is coupled to the second end 10312 of the first switch 1031 through the first center point 1033 of the first bridge arm 103. The second end 10322 of the second switch 1032 is coupled to the second parallel point 1*b*. The third end 10313 of the first switch 1031 and the third end 10323 of the second switch 1032 are configured to receive a control signal.

The first conduction element 1041 includes a first end 10411 and a second end 10412. The second conduction element 1042 includes a first end 10421 and a second end 10422. The first end 10411 of the first conduction element 1041 is coupled to the first parallel point 1*a*, and the second end 10412 of the first conduction element 1041 is coupled to a second center point 1043 of the second bridge arm 104. The first end 10421 of the second conduction element 1042 is coupled to the second center point 1043 of the second bridge arm 104, and the first end 10421 of the second conduction element 1042 is coupled to the second end 10412 of the first conduction element 1041 through the second center point 1043 of the second bridge arm 104. The second end 10422 of the second conduction element 1042 is coupled to the second parallel point 1*b*.

The input inductance element 105 is coupled to the first center point 1033 of the first bridge arm 103, where the input inductance element 105 and the second center point 1043 of the second bridge arm 104 are configured to be coupled to a power supply 109 and receive an alternating current generated by the power supply 109. The main capacitor element 106 is connected in series to the magnetizing inductance element 107, and the main capacitor element 106 and the magnetizing inductance element 107 are connected in parallel to the second bridge arm 104 between the first parallel point 1*a* and the second parallel point 1*b*. The first end 10411 of the first conduction element 1041 is coupled to the first end 10311 of the first switch 1031 and the main capacitor element 106 through the first parallel point 1*a*. The second end 10422 of the second conduction element 1042 is coupled to the second end 10322 of the second switch 1032 and the magnetizing inductance element 107 through the second parallel point 1*b*.

The voltage transformation element 108 includes a primary side 1081 and a secondary side 1082. A turns ratio of the voltage transformation element 108 is n:1. Positive and negative polarities of mutual inductance voltages on the primary side 1081 and the secondary side 1082 are shown as a marking dot 1083 in the voltage transformation element 108 in FIG. 1. The primary side 1081 of the voltage transformation element 108 is connected in parallel to the magnetizing inductance element 107. The secondary side 1082 of the voltage transformation element 108 is coupled to a load 110. The load 110 includes an output diode Do, an output capacitor Co, and an output load resistor $R_L$. A voltage on the output load resistor $R_L$ is an output voltage Vo of the conversion unit 101.

In the embodiment in FIG. 1, due to the use of a single-stage bridgeless architecture for directly processing an alternating current input voltage by the first bridge arm 103 and the second bridge arm 104, the conversion system 100 has advantages such as a simple circuit structure and high conversion efficiency.

Figure 2:
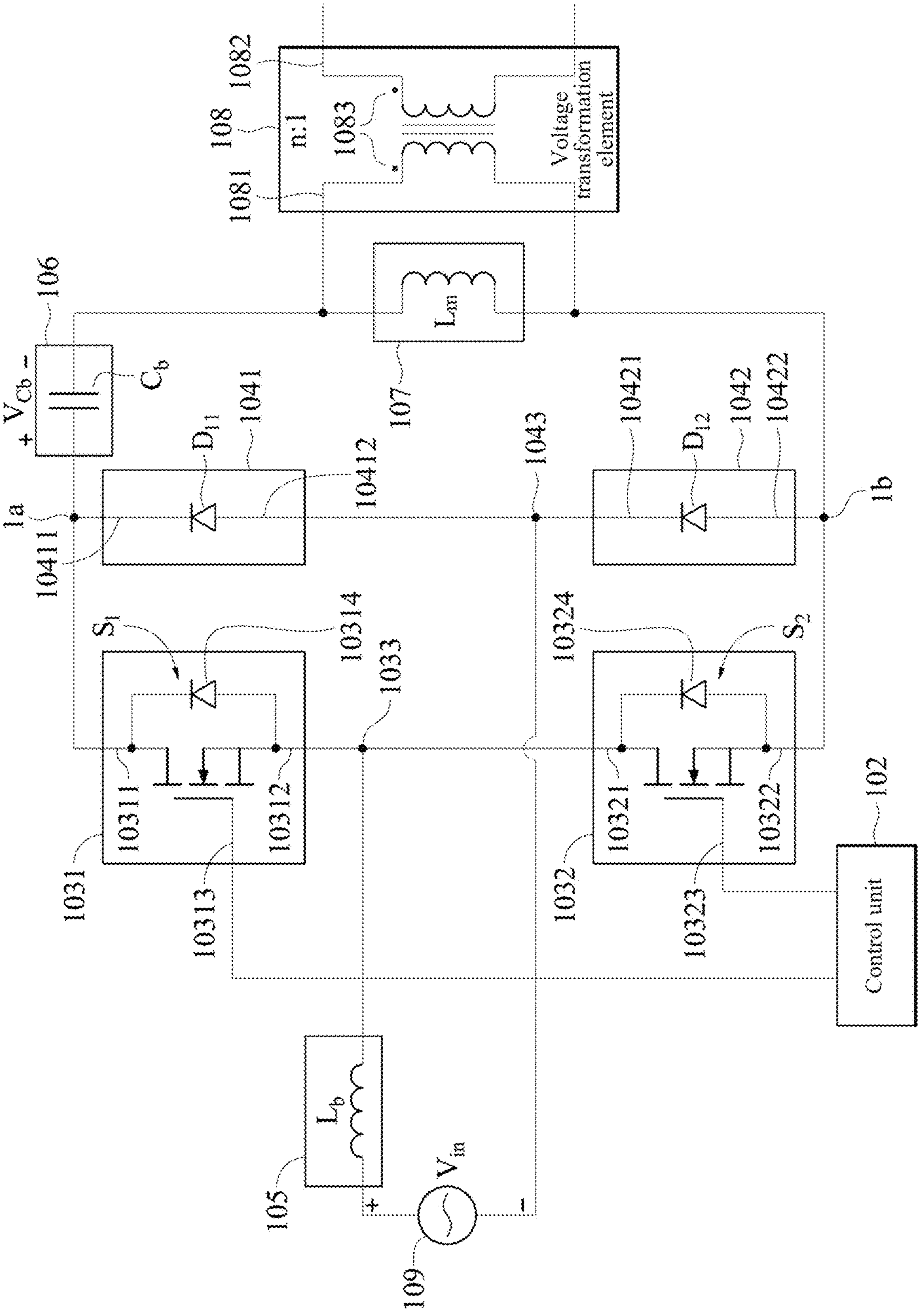
FIG. 2 is a circuit diagram of the conversion system according to an embodiment of the present invention.

FIG. 2 is a circuit diagram of the conversion system according to an embodiment of the present invention. Referring to FIG. 1 and FIG. 2 together, in the embodiment shown in FIG. 2, the first switch 1031 includes a transistor S1, where the transistor $S_1$ is an NMOS. A drain of the transistor $S_1$ is the first end 10311 of the first switch 1031, a gate of the transistor $S_1$ is the third end 10313 of the first switch 1031, and a source of the transistor $S_1$ is the second end 10312 of the first switch 1031. The transistor S1 further includes an internal diode 10314. The second switch 1032 includes a transistor $S_2$, where the transistor $S_2$ is an NMOS. A drain of the transistor $S_2$ is the first end 10321 of the second switch 1032, a gate of the transistor $S_2$ is the third end 10323 of the second switch 1032, and a source of the transistor S2 is the second end 10322 of the second switch 1032. The transistor $S_2$ further includes an internal diode 10324.

The first conduction element 1041 includes a first diode $D_{11}$, and the second conduction element 1042 includes a second diode $D_{12}$. A cathode and an anode of the first diode $D_{11}$ are respectively the first end 10411 of the first conduction element 1041 and the second end 10412 of the first conduction element 1041. A cathode and an anode of the second diode $D_{12}$ are respectively the first end 10421 of the second conduction element 1042 and the second end 10422 of the second conduction element 1042.

The input inductance element 105 includes an inductor $L_b$, the main capacitor element 106 includes a capacitor $C_b$, and the magnetizing inductance element 107 includes an inductor $L_m$.

Figure 3:
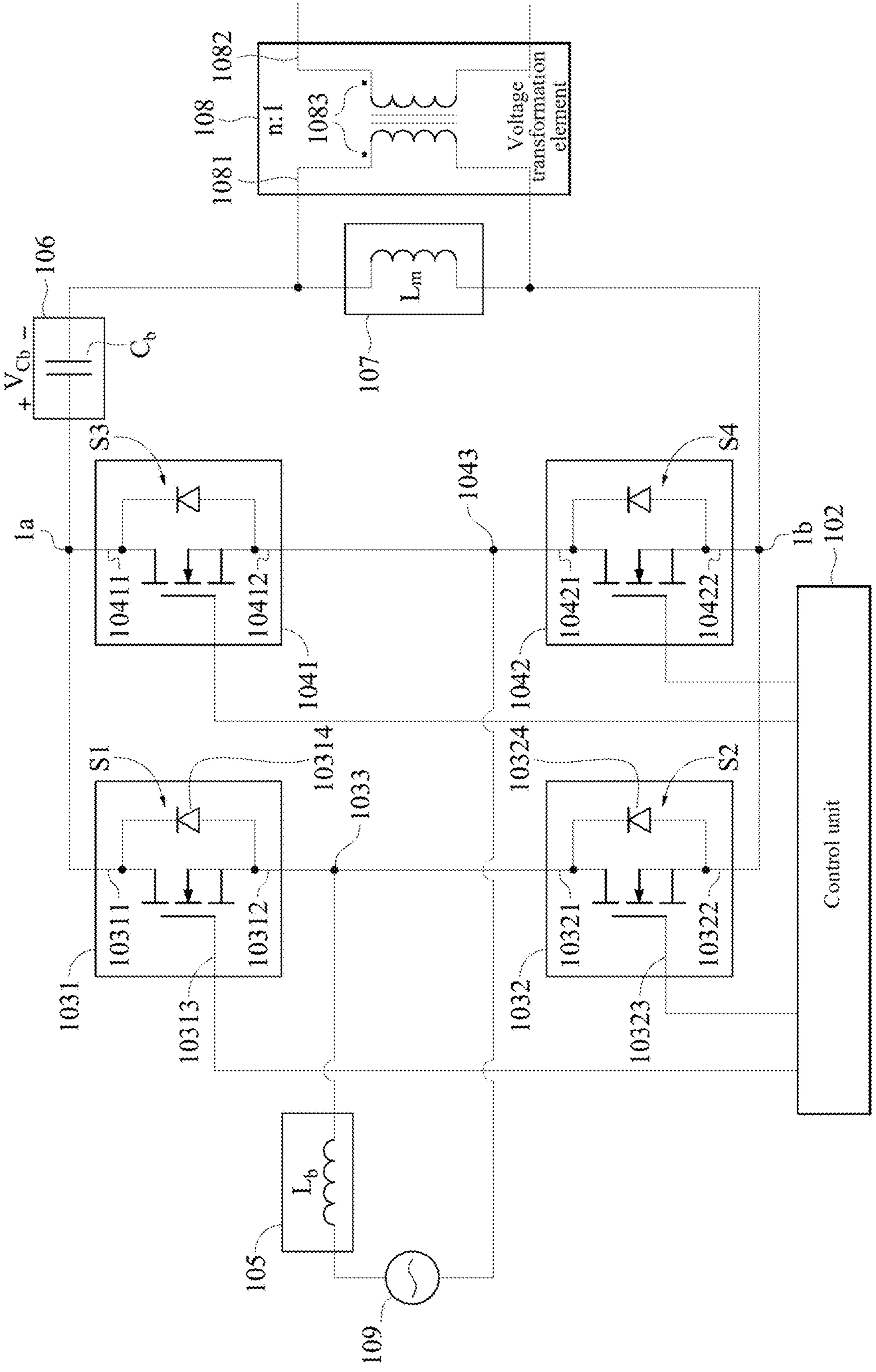
FIG. 3 is a circuit diagram of the conversion system according to an embodiment of the present invention.

FIG. 3 is a circuit diagram of the conversion system according to an embodiment of the present invention. Referring to FIG. 1, FIG. 2, and FIG. 3 together, in the embodiment shown in FIG. 3, compared with the embodiment in FIG. 2, the first conduction element 1041 in FIG. 3 includes a transistor $S_3$, and the second conduction element 1042 in FIG. 3 includes a transistor S4, where the transistor $S_3$ and the transistor S4 are both NMOSs. A drain of the transistor $S_3$ is the first end 10411 of the first conduction element 1041, and a source of the transistor S3 is the second end 10412 of the first conduction element 1041. A drain of the transistor $S_4$ is the first end 10421 of the second conduction element 1042, and a source of the transistor $S_4$ is the second end 10422 of the second conduction element 1042. Gates of the transistor S3 and the transistor $S_4$ are configured to receive a control signal.

Still referring to FIG. 1, FIG. 2, and FIG. 3, in some embodiments of the present invention, the conversion system 100 further includes a control unit 102. In the embodiment shown in FIG. 2, the control unit 102 is separately coupled to the third end 10313 of the first switch 1031 and the third end 10323 of the second switch 1032, so that the third end 10313 of the first switch 1031 and the third end 10323 of the second switch 1032 can receive a control signal from the control unit 102. In the embodiment shown in FIG. 3, the control unit 102 is separately coupled to the third end 10313 of the first switch 1031, the third end 10323 of the second switch 1032, the gate of the transistor $S_3$, and the gate of the transistor $S_4$, so that the third end 10313 of the first switch 1031, the third end 10323 of the second switch 1032, the gate of the transistor $S_3$, and the gate of the transistor $S_4$ can receive a control signal from the control unit 102. In some embodiments of the present invention, the control unit 102 transmits a control signal to the gates of the transistor $S_3$ and the transistor $S_4$, so that circuit actions of the transistor $S_3$ and the transistor $S_4$ are the same on the first diode $D_{11}$ and the second diode $D_{12}$ respectively.

A conversion method and cooperation between modules of the conversion system 100 according to some embodiments of the present invention are described in detail below with reference to the accompanying drawings.

Figure 21:
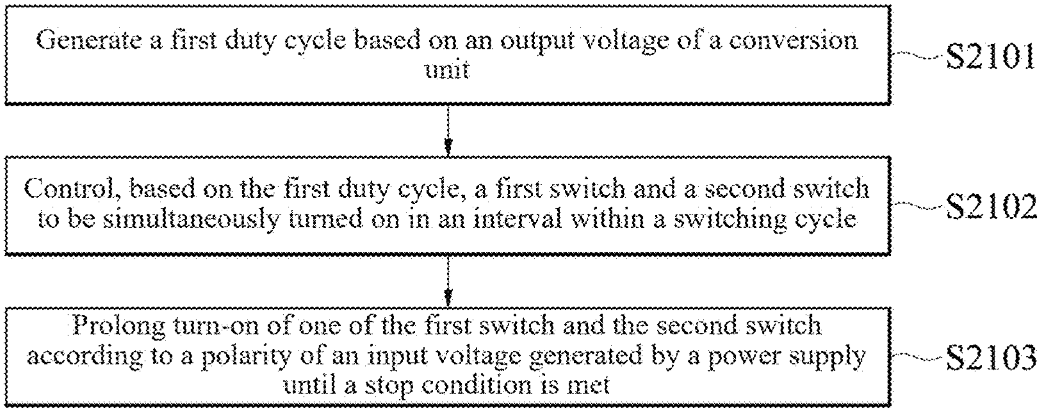
FIG. 21 is a flowchart of a conversion method according to some embodiments of the present invention.

FIG. 21 is a flowchart of a conversion method according to some embodiments of the present invention. Referring to FIG. 1 and FIG. 21 together, in this embodiment, the conversion method includes steps S2101 to S2103 performed by the control unit 102. In step S2101, the control unit 102 generates a first duty cycle based on an output voltage Vo of the conversion unit 101. In step S2102, the control unit 102 controls, based on the first duty cycle, the first switch 1031 and the second switch 1032 to be simultaneously turned on in an interval within a switching interval. In step S2103, the control unit 102 prolongs turn-on of one of the first switch 1031 and the second switch 1032 according to a polarity of an input voltage Vin generated by the power supply 109 until a stop condition is met.

Figure 4A:
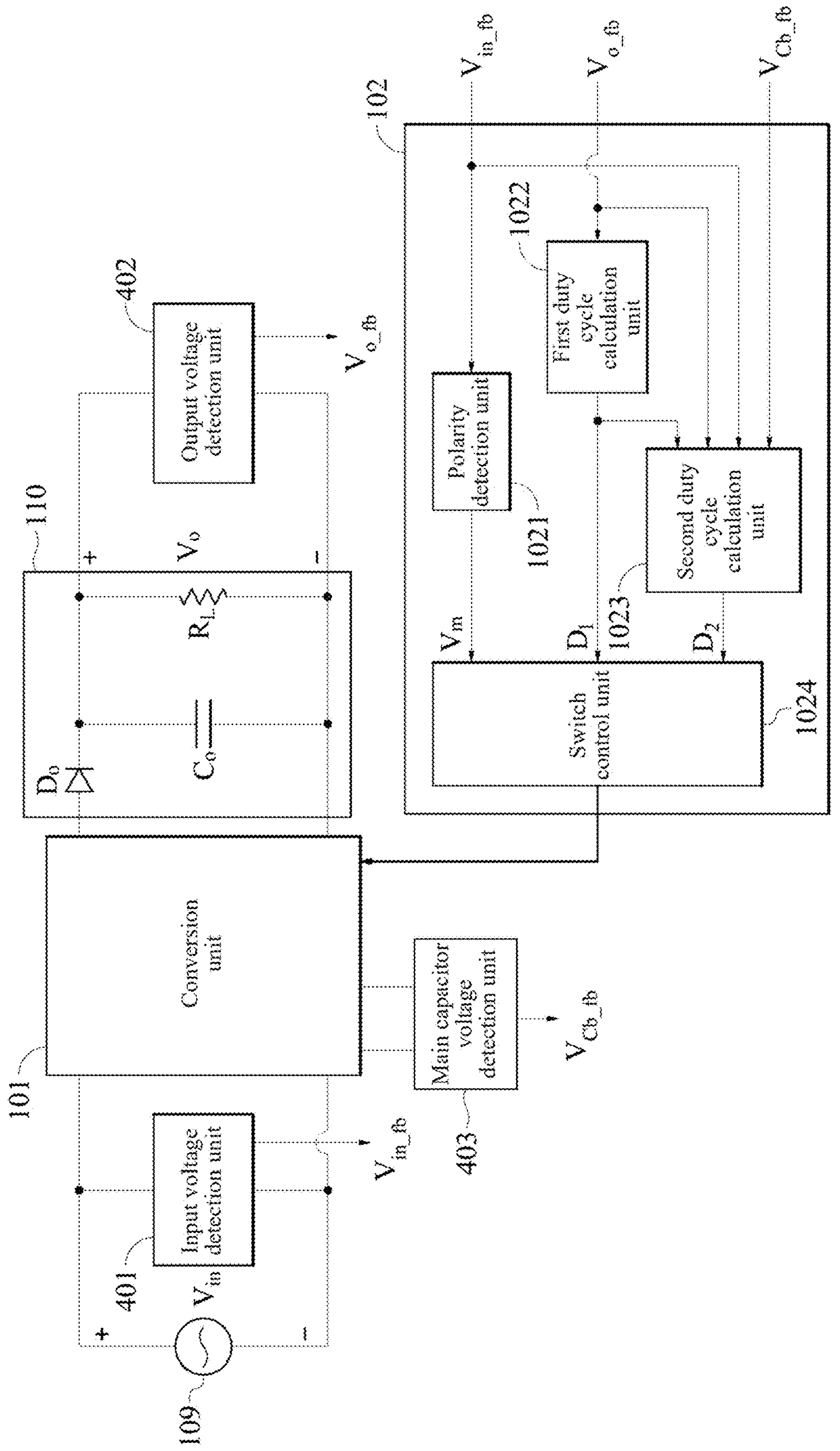
FIG. 4A is a block diagram of the conversion system according to an embodiment of the present invention.

FIG. 4A is a block diagram of the conversion system according to an embodiment of the present invention. Referring to FIG. 4A, in some embodiments of the present invention, the conversion system 100 includes an input voltage detection unit 401, and the control unit 102 includes a polarity detection unit 1021. The input voltage detection unit 401 is configured to detect the input voltage $V_{in}$ generated by the power supply 109 and generate an input voltage detection signal $V_{in\_fb}$. The polarity detection unit 1021 receives the input voltage detection signal $V_{in\_fb}$, detects a polarity of the input voltage $V_{in}$ generated by the power supply 109 based on the input voltage detection signal $V_{in\_fb}$, and outputs the polarity of the input voltage $V_{in}$ generated by the power supply 109 by outputting a polarity signal $V_m$. In this embodiment, the conversion method includes: detecting and outputting, by the polarity detection unit 1021, the polarity of the input voltage $V_{in}$ generated by the power supply 109.

Still referring to FIG. 4A, in some embodiments of the present invention, the conversion system 100 includes an output voltage detection unit 402, and the control unit 102 includes a first duty cycle calculation unit 1022. The output voltage detection unit 402 is configured to detect the output voltage $V_O$ of the conversion unit 101 and generate an output voltage detection signal $V_{O\_fb}$. The first duty cycle calculation unit 1022 receives the output voltage detection signal $V_{O\_fb}$, and obtains the output voltage $V_O$ of the conversion unit 101 based on the output voltage detection signal $V_{O\_fb}$. The first duty cycle calculation unit 1022 generates a first duty cycle D1 based on the output voltage $V_O$ of the conversion unit 101.

Figure 5:
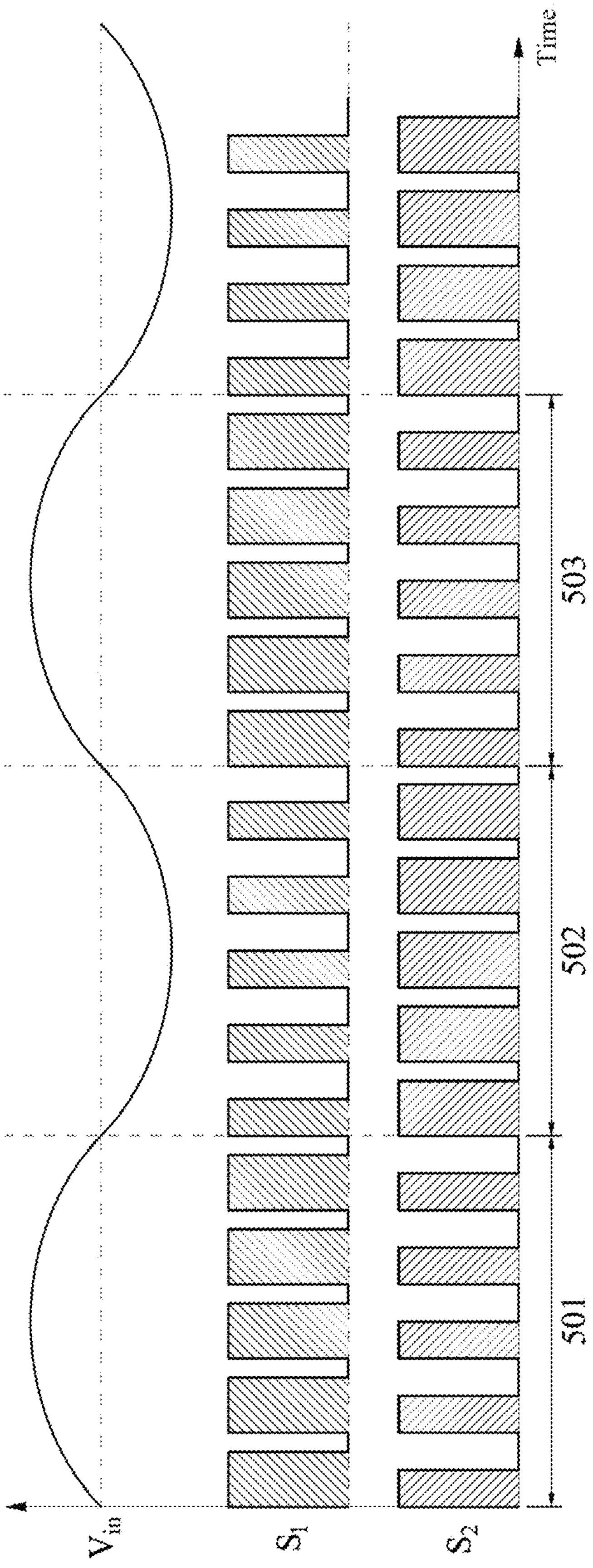
FIG. 5 is a schematic diagram of switch-controlled timing according to an embodiment of the present invention.
Figure 7:
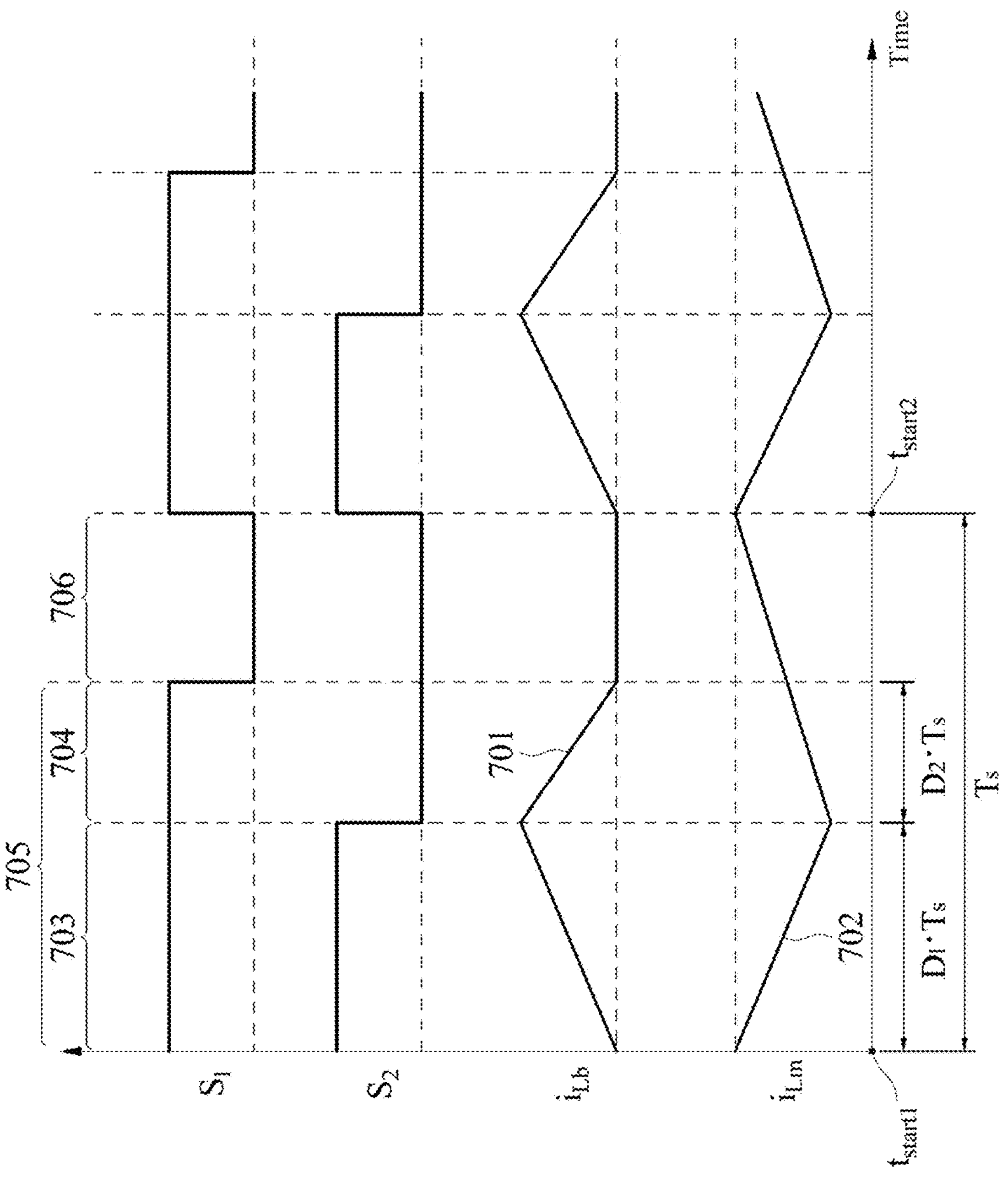
FIG. 7 is a schematic diagram of switch-controlled timing according to an embodiment of the present invention.
Figure 9:
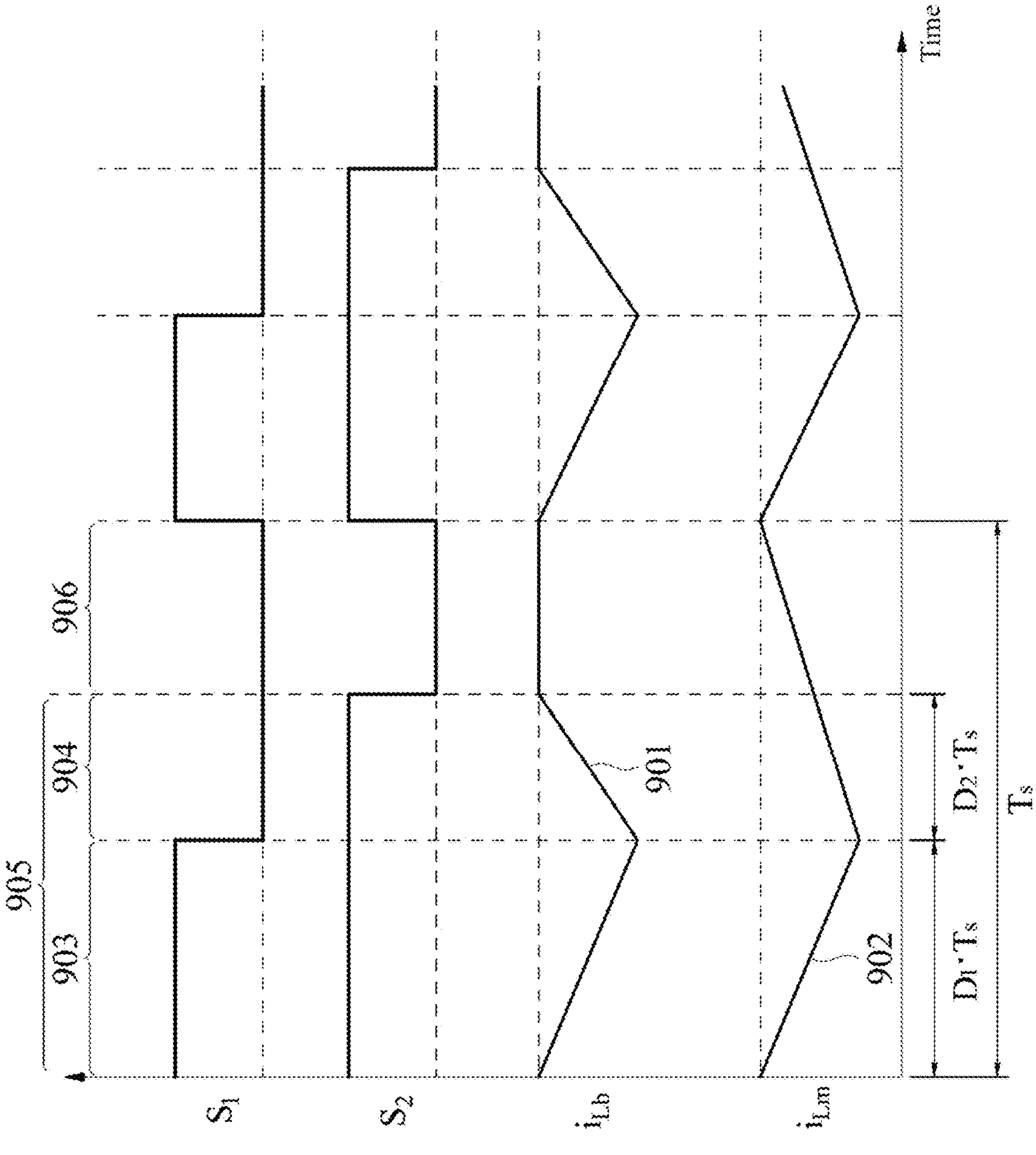
FIG. 9 is a schematic diagram of switch-controlled timing according to an embodiment of the present invention.
Figure 22:
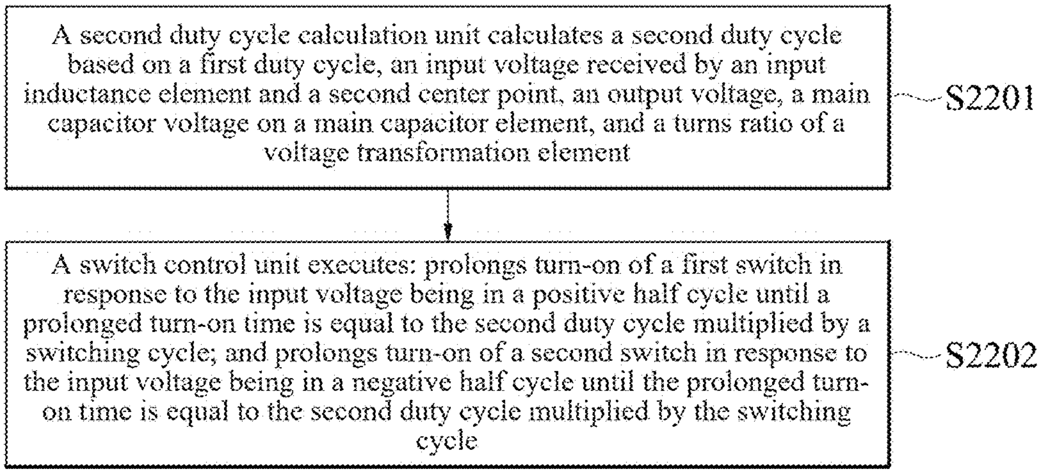
FIG. 22 is a flowchart of the conversion method according to some embodiments of the present invention.

FIG. 5 is a schematic diagram of switch-controlled timing according to an embodiment of the present invention. FIG. 7 is a schematic diagram of switch-controlled timing according to an embodiment of the present invention. FIG. 9 is a schematic diagram of switch-controlled timing according to an embodiment of the present invention. FIG. 22 is a flowchart of the conversion method according to some embodiments of the present invention. Referring to FIG. 2, FIG. 4A, FIG. 5, FIG. 7, FIG. 9, and FIG. 22 together, following the embodiment of FIG. 2, in the embodiment shown in FIG. 22, the conversion system 100 includes a main capacitor voltage detection unit 403, and the control unit 102 includes a second duty cycle calculation unit 1023 and a switch control unit 1024. The main capacitor voltage detection unit 403 is configured to detect a main capacitor voltage $V_{Cb}$ on the main capacitor element 106 and generate a main capacitor voltage detection signal $V_{Cb\_fb}$. The second duty cycle calculation unit 1023 receives the input voltage detection signal $V_{in\_fb}$, the output voltage detection signal $V_{O\_fb}$, and the main capacitor voltage detection signal $V_{Cb\_fb}$. In addition, the second duty cycle calculation unit 1023 obtains the input voltage Vin generated by the power supply 109 based on the input voltage detection signal $V_{in\_fb}$, obtains the output voltage Vo of the conversion unit 101 based on the output voltage detection signal $V_{O\_fb}$, and obtains the main capacitor voltage $V_{Cb}$ on the main capacitor element 106 based on the main capacitor voltage detection signal $V_{Cb\_fb}$.

The second duty cycle calculation unit 1023 is configured to calculate a second duty cycle $D_2$ based on the first duty cycle $D_1$, the input voltage $V_{in}$ generated by the power supply 109 (received by the input inductance element 105 and the second center point 1043), the output voltage $V_O$ of the conversion unit 101, the main capacitor voltage $V_{Cb}$ on the main capacitor element 106, and the turns ratio (n in this embodiment, where n is a positive number) of the voltage transformation element 108.

The switch control unit 1024 of the control unit 102 is configured to receive the polarity signal $V_m$, the first duty cycle $D_1$, and the second duty cycle $D_2$, and generate a control signal based on the polarity of the input voltage Vin generated by the power supply 109, the first duty cycle $D_1$, and the second duty cycle $D_2$ to control the transistor $S_1$ of the first switch 1031 and the transistor $S_2$ of the second switch 1032.

In this embodiment, the switching cycle is Ts, that is, duration of the switching interval is Ts. The foregoing step S2103 includes steps S2201 and S2202. In step S2201, the second duty cycle calculation unit 1023 calculates the second duty cycle $D_2$ based on the first duty cycle $D_1$, the input voltage $V_{in}$ generated by the power supply 109 (received by the input inductance element 105 and the second center point 1043), the output voltage $V_O$ of the conversion unit 101, the main capacitor voltage $V_{Cb}$ on the main capacitor element 106, and the turns ratio (n in this embodiment) of the voltage transformation element 108. In step S2202, the switch control unit 1024 executes: prolongs the turn-on of the first switch 1031 (transistor S1) in response to the input voltage $V_{in}$ being in a positive half cycle until a prolonged turn-on time is equal to the second duty cycle $D_2$ multiplied by the switching cycle Ts (as shown in a positive half cycle interval 501 and a positive half cycle interval 503 in FIG. 5); and prolongs the turn-on of the second switch 1032 (transistor $S_2$) in response to the input voltage $V_{in}$ being in a negative half cycle until the prolonged turn-on time is equal to the second duty cycle $D_2$ multiplied by the switching cycle Ts (as shown in a negative half cycle interval 502 in FIG. 5). In other words, in this embodiment, the stop condition is that the prolonged turn-on time is equal to the second duty cycle $D_2$ multiplied by the switching cycle Ts.

Referring to FIG. 5, FIG. 7, and FIG. 9 together, when the input voltage $V_{in}$ is in the positive half cycle, in an interval 703 (whose duration is $D_1 \cdot Ts$) within a switching interval 705 (corresponding to the positive half cycle interval 501 and the positive half cycle interval 503 in FIG. 5, where duration of the switching interval 705 is the switching cycle Ts), the switch control unit 1024 transmits a high-voltage signal to the first switch 1031 (transistor $S_1$) and the second switch 1032 (transistor $S_2$) to turn on the first switch 1031 (transistor S1) and the second switch 1032 (transistor $S_2$) simultaneously. In an interval 704 (whose duration is $D_2 \cdot Ts$) within the switching interval 705, the switch control unit 1024 transmits a low-voltage signal to the second switch 1032 (transistor $S_2$) to turn off the second switch 1032 (transistor $S_2$), and continuously transmits the high-voltage signal to the first switch 1031 (transistor S1) to prolong the turn-on of the first switch 1031 (transistor $S_1$).

When the input voltage $V_{in}$ is in the negative half cycle, in an interval 903 (whose duration is $D_1 \cdot Ts$) within a switching interval 905 (corresponding to the negative half cycle interval 502 in FIG. 5, where duration of the switching interval 905 is the switching cycle Ts), the switch control unit 1024 transmits the high-voltage signal to the first switch 1031 (transistor S1) and the second switch 1032 (transistor $S_2$) to turn on the first switch 1031 (transistor $S_1$) and the second switch 1032 (transistor $S_2$) simultaneously. In an interval 904 (whose duration is $D_2 \cdot Ts$) within the switching interval 905, the switch control unit 1024 transmits the low-voltage signal to the first switch 1031 (transistor $S_1$) to turn off the first switch 1031 (transistor $S_1$), and continuously transmits the high-voltage signal to the second switch 1032 (transistor $S_2$) to prolong the turn-on of the second switch 1032 (transistor $S_2$).

It should be noted that, the second duty cycle D2 is calculated based on the first duty cycle $D_1$, the input voltage $V_{in}$ generated by the power supply 109, the output voltage $V_O$ of the conversion unit 101, the main capacitor voltage $V_{Cb}$ on the main capacitor element 106, and the turns ratio of the voltage transformation element 108. Therefore, in a same switching interval, the second duty cycle $D_2$ changes with the changes of the first duty cycle $D_1$, the input voltage $V_{in}$ generated by the power supply 109, the output voltage $V_O$ of the conversion unit 101, and the main capacitor voltage $V_{Cb}$ on the main capacitor element 106.

Referring to FIG. 3, FIG. 4A, FIG. 5, FIG. 7, FIG. 9, and FIG. 22 together, in some embodiments of the present invention, the control unit 102 transmits a control signal to the gates of the transistor $S_3$ and the transistor $S_4$, so that circuit actions of the transistor $S_3$ and the transistor $S_4$ are the same on the first diode $D_{11}$ and the second diode $D_{12}$ respectively. In this embodiment, steps S2201 and S2202 disclosed in the foregoing embodiment may be applied to the conversion system 100 including the circuit shown in FIG. 3.

Figure 4B:
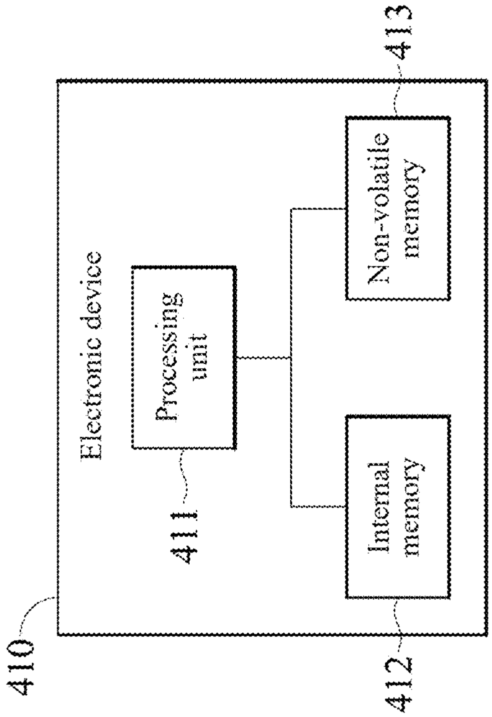
FIG. 4B is a block diagram of an electronic device according to some embodiments of the present invention.

FIG. 4B is a block diagram of an electronic device according to some embodiments of the present invention. As shown in FIG. 4B, on a hardware level, the electronic device 410 includes a processing unit 411, an internal memory 412, and a non-volatile memory 413. The internal memory 412 is, for example, a random-access memory (RAM). The non-volatile memory 413 is, for example, at least one magnetic disk memory. Definitely, the electronic device 410 may further include hardware required for other functions. The internal memory 412 and the non-volatile memory 413 are configured to store a program. The program may include program code, and the program code includes computer operation instructions. The internal memory 412 and the non-volatile memory 413 provide instructions and data to the processing unit 411. The processing unit 411 reads a corresponding computer program from the non-volatile memory 413 into the internal memory 412 and then runs the computer program, to form the control unit 102 on a logical level.

The processing unit 411 may be an integrated circuit chip with a signal processing capability. In an implementation process, the method and steps disclosed in the foregoing embodiments may be implemented by using a hard integrated logic circuit or an instruction in a software form in the processing unit 411. The processing unit 411 may be a general-purpose processor, including a central processing unit, a digital signal processor, a dedicated integrated circuit, a field programmable gate array, or another programmable logic device. An embodiment of this specification further provides a computer-readable storage medium. The computer-readable storage medium stores at least one instruction. The at least one instruction, when executed by the processing unit 411 of the electronic device 410, enables the processing unit 411 of the electronic device 410 to perform functions of the control unit 102. A storage medium of the computer includes, but is not limited to, a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another internal memory technology, a read-only compact disc read-only memory (CD-ROM), a digital versatile disc (DVD) or another optical memory, a magnetic cassette tape, a tape-type magnetic disk memory or another magnetic storage device, or any other non-transmission medium, which may be configured to store information accessible by a computing device. As defined in this specification, the computer-readable medium does not include transitory media, such as modulated data signals and carrier waves.

It should be noted that, the polarity detection unit 1021, the first duty cycle calculation unit 1022, the second duty cycle calculation unit 1023, and the switch control unit 1024 in the control unit 102 may be partially implemented by hardware and partially implemented by software. This is not limited in the present invention.

Figure 6:
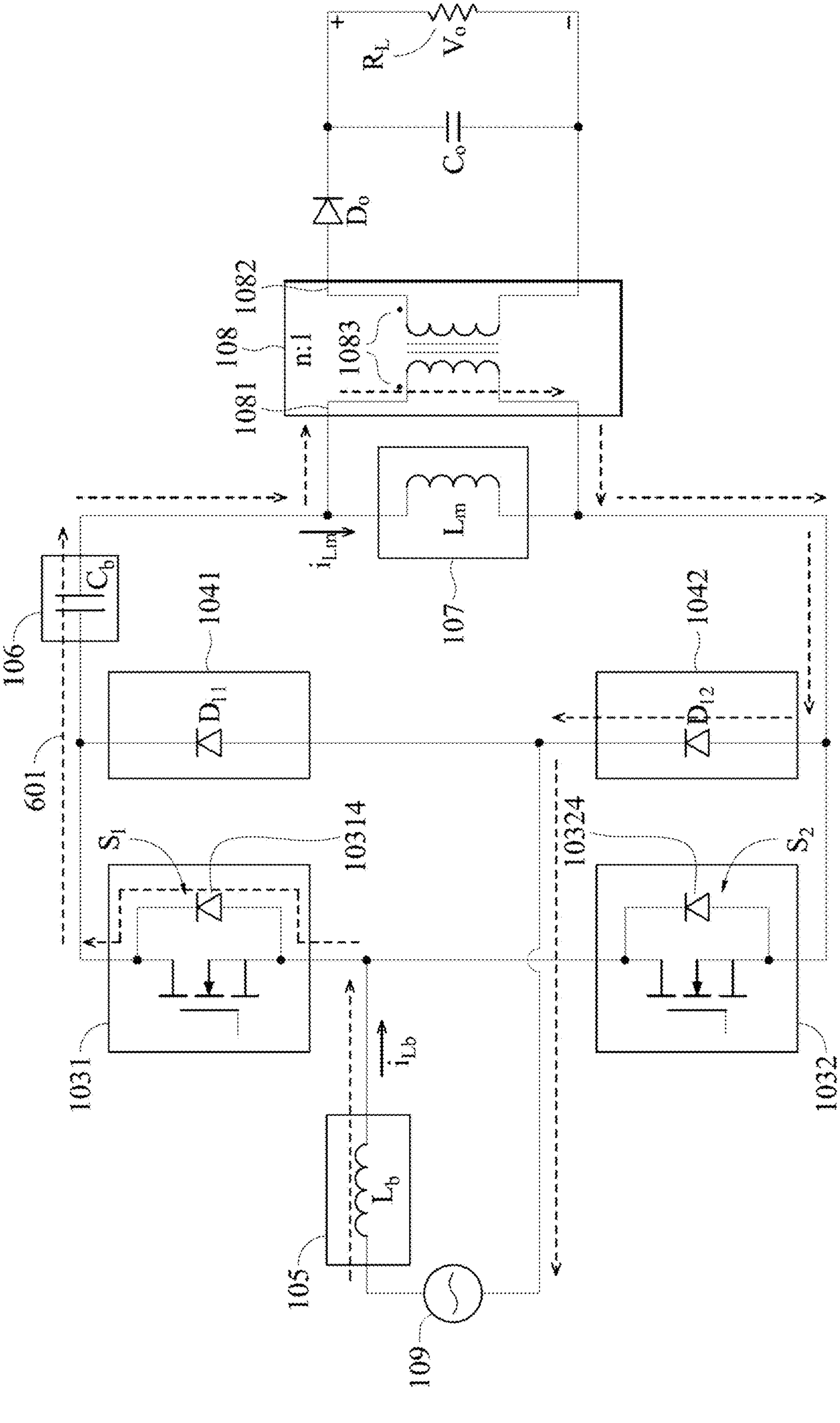
FIG. 6 is a schematic diagram of a loss of the conversion system according to an embodiment of the present invention.

FIG. 6 is a schematic diagram of a loss of the conversion system according to an embodiment of the present invention. Referring to FIG. 2 and FIG. 6, following the embodiment of FIG. 2, in this embodiment, a current $i_{Lb}$ is a current flowing through the input inductance element 105, and a current $i_{Lm}$ is a current flowing through the magnetizing inductance element 107. In this embodiment, because the transistor S1 includes the internal diode 10314, when the transistor S1 is turned off, the current $i_{Lb}$ generates a loss through the internal diode 10314 of the transistor $S_1$. As shown in FIG. 6, when the input voltage $V_{in}$ is in the positive half cycle, the current $i_{Lb}$ generates a loss in the internal diode 10314 through a path 601. Similarly, when the input voltage $V_{in}$ is in the negative half cycle, the current $i_{Lb}$ generates a loss through the internal diode 10324 of the transistor $S_2$. It should be noted that even if the first switch 1031 and the second switch 1032 use a GaN field-effect transistor (GaN FET) as a switch, when the input voltage $V_{in}$ is in the positive half cycle, the current $i_{Lb}$ generates a source-drain voltage drop in the first switch 1031 to generate a loss, and when the input voltage $V_{in}$ is in the negative half cycle, the current $i_{Lb}$ generates a source-drain voltage drop in the second switch 1032 to generate a loss. Therefore, in the foregoing step S2202, if the prolonged turn-on time for prolonging the turn-on of the first switch 1031 (transistor S1) just makes the current $i_{Lb}$ drop to 0, and in the foregoing step S2203, if the prolonged turn-on time for prolonging the turn-on of the second switch 1032 (transistor S2) just makes the current $i_{Lb}$ rise to 0 (as shown in a current curve 701 of the current iLb in FIG. 7 and a current curve 901 of the current $i_{Lb}$ in FIG. 9), the loss during operation of the conversion system 100 can be further reduced. A current curve corresponding to the current $i_{Lm}$ is shown as a current curve 702 in FIG. 7 and a current curve 902 in FIG. 9.

Figure 8A:
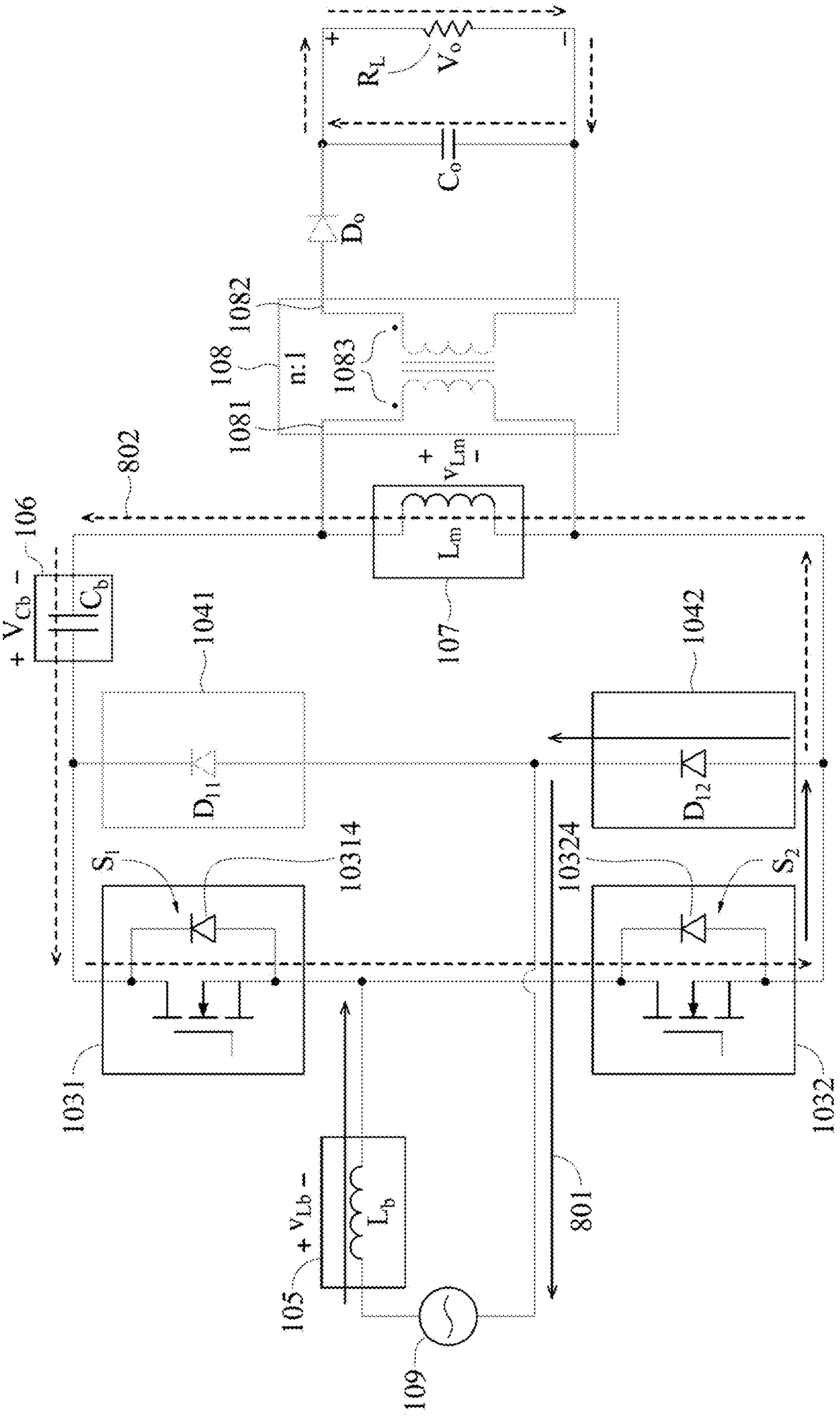
FIG. 8A to FIG. 8C are schematic diagrams of operation analysis of the conversion system according to an embodiment of the present invention.
Figure 8B:
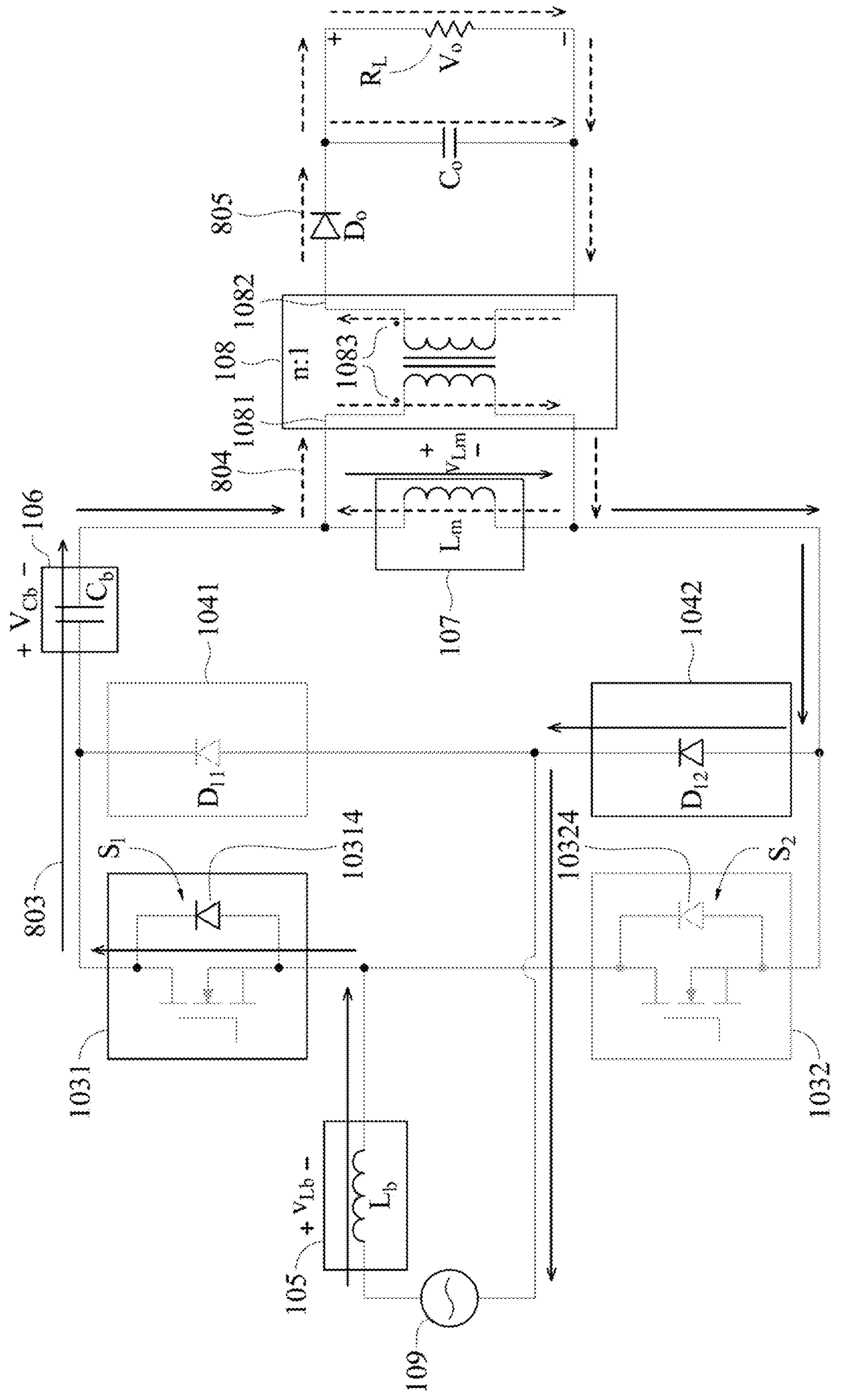
Figure 8C:
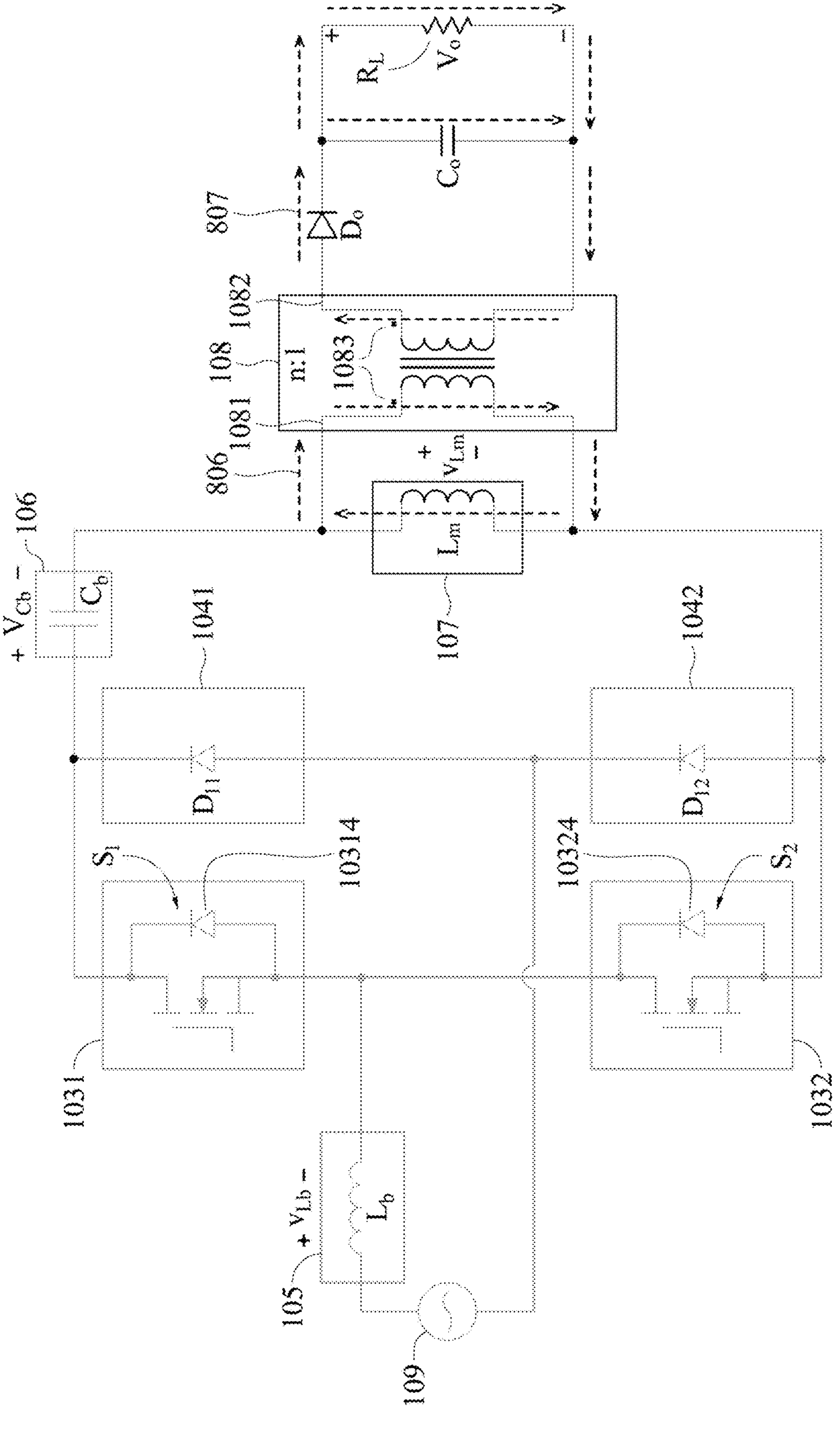

FIG. 8A to FIG. 8C are schematic diagrams of operation analysis of the conversion system according to an embodiment of the present invention. Refer to FIG. 2, FIG. 7, and FIG. 8A to FIG. 8C together. When the input voltage $V_{in}$ is in the positive half cycle, a voltage value of the input voltage $V_{in}$ is $V_i$, where $V_i$ is a non-negative real number, and $V_i$ ranges from 0 to a maximum value of the input voltage $V_{in}$. In the interval 703, it can be seen from a path 801 (a loop formed by the input inductance element 105, the second switch 1032, the second conduction element 1042, and the power supply 109) and a path 802 (a loop formed by the magnetizing inductance element 107, the main capacitor element 106, the first switch 1031, and the second switch 1032) in FIG. 8A, and the Kirchhoff Circuit Laws that $v_{Lb}=V_i$ and $v_{Lm}=-V_{Cb}$, where the voltage $v_{Lb}$ is a voltage on the input inductance element 105, and the voltage $v_{Lm}$ is a voltage on the magnetizing inductance element 107. In the interval 704, it can be seen from a path 803 (a loop formed by the input inductance element 105, the internal diode 10314, the main capacitor element 106, the magnetizing inductance element 107, the second conduction element 1042, and the power supply 109), a path 804 (a loop formed by the magnetizing inductance element 107 and the primary side 1081), and a path 805 (two loops formed by the secondary side 1082, the output diode Do, the output capacitor Co, and the output load resistor RL) in FIG. 8B, and the Kirchhoff Circuit Laws that $v_{Lb}=V_i-V_{Cb}-nV_O$ and $v_{Lm}=nV_O$, where $V_O$ is an output voltage of the conversion unit 101.

In an interval 706, only a path 806 (a loop formed by the magnetizing inductance element 107 and the primary side 1081) and a path 807 (two loops formed by the secondary side 1082, the output diode Do, the output capacitor Co, and the output load resistor RL) in FIG. 8C remain in operation. When the interval 706 ends, $v_{Lb}=0$ and $v_{Lm}=0$. From the volt second balance principle, it can be seen that $D_1 \cdot T_S \cdot V_i + D_2 \cdot (V_i - v_{Cb} - nV_o) = 0$. Therefore, it can be obtained that $$D_2 = \frac{D_1 \cdot V_i}{V_{Cb} + nV_o - V_i}.$$

Figure 10A:
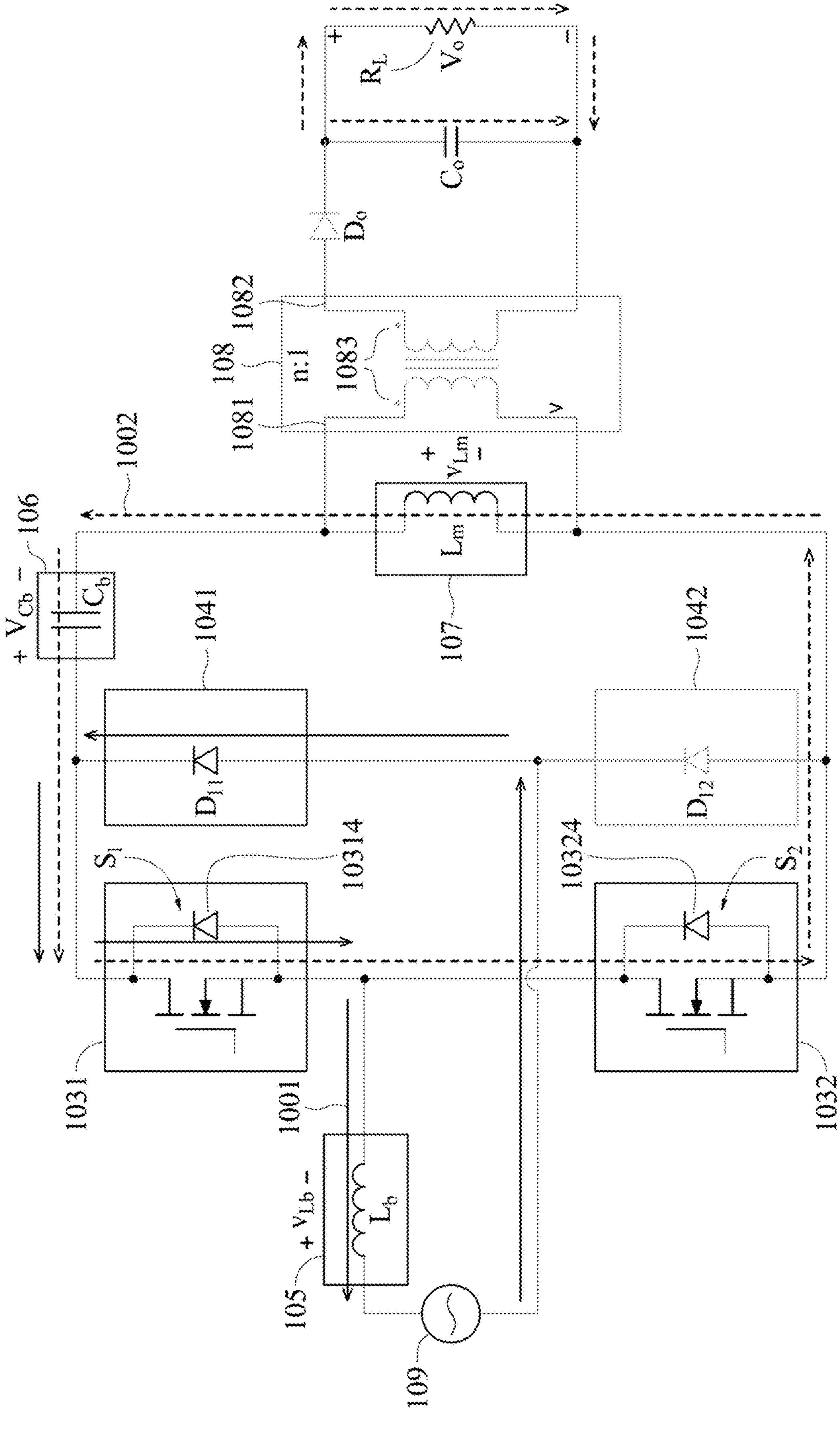
FIG. 10A to FIG. 10C are schematic diagrams of operation analysis of the conversion system according to an embodiment of the present invention.
Figure 10B:
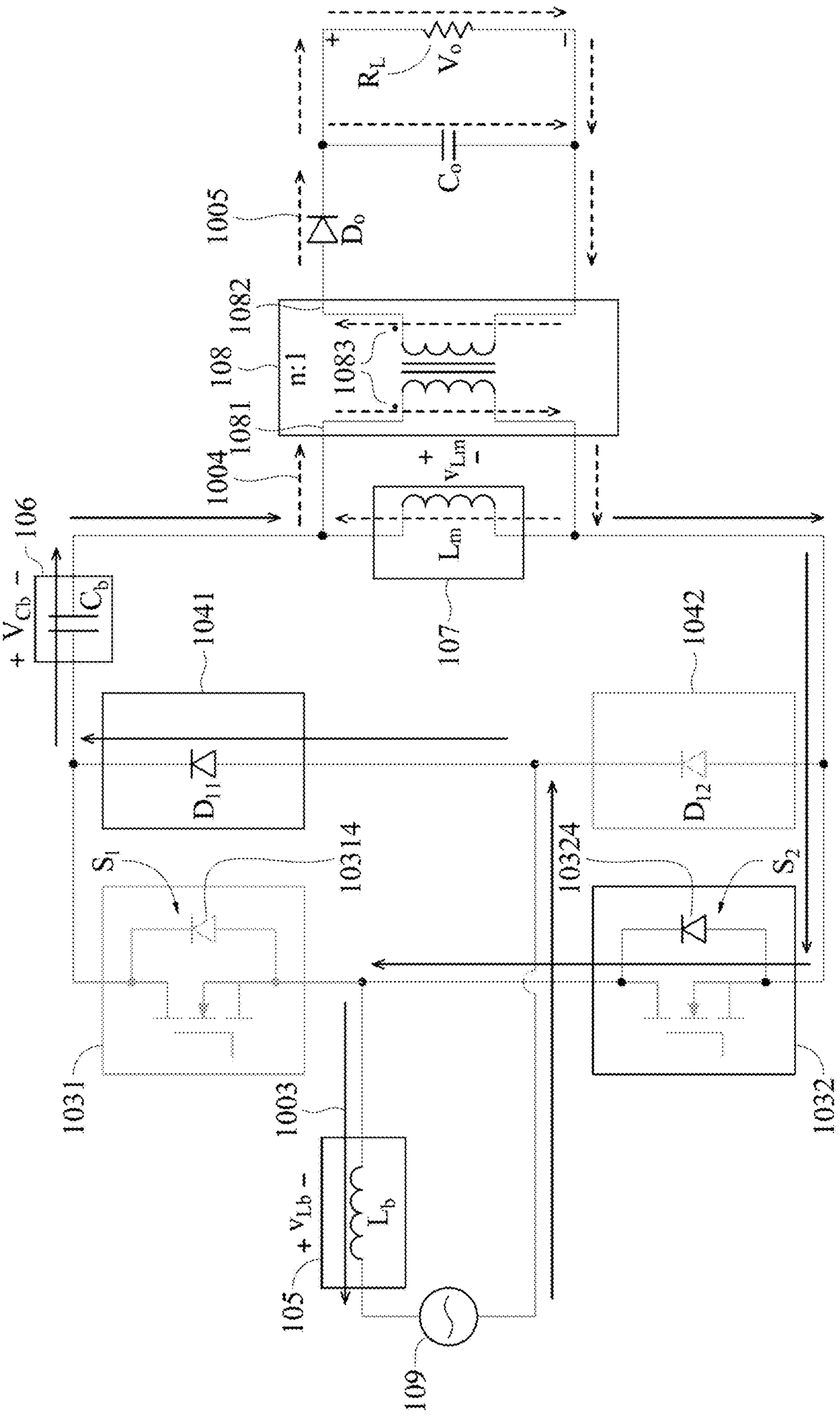
Figure 10C:
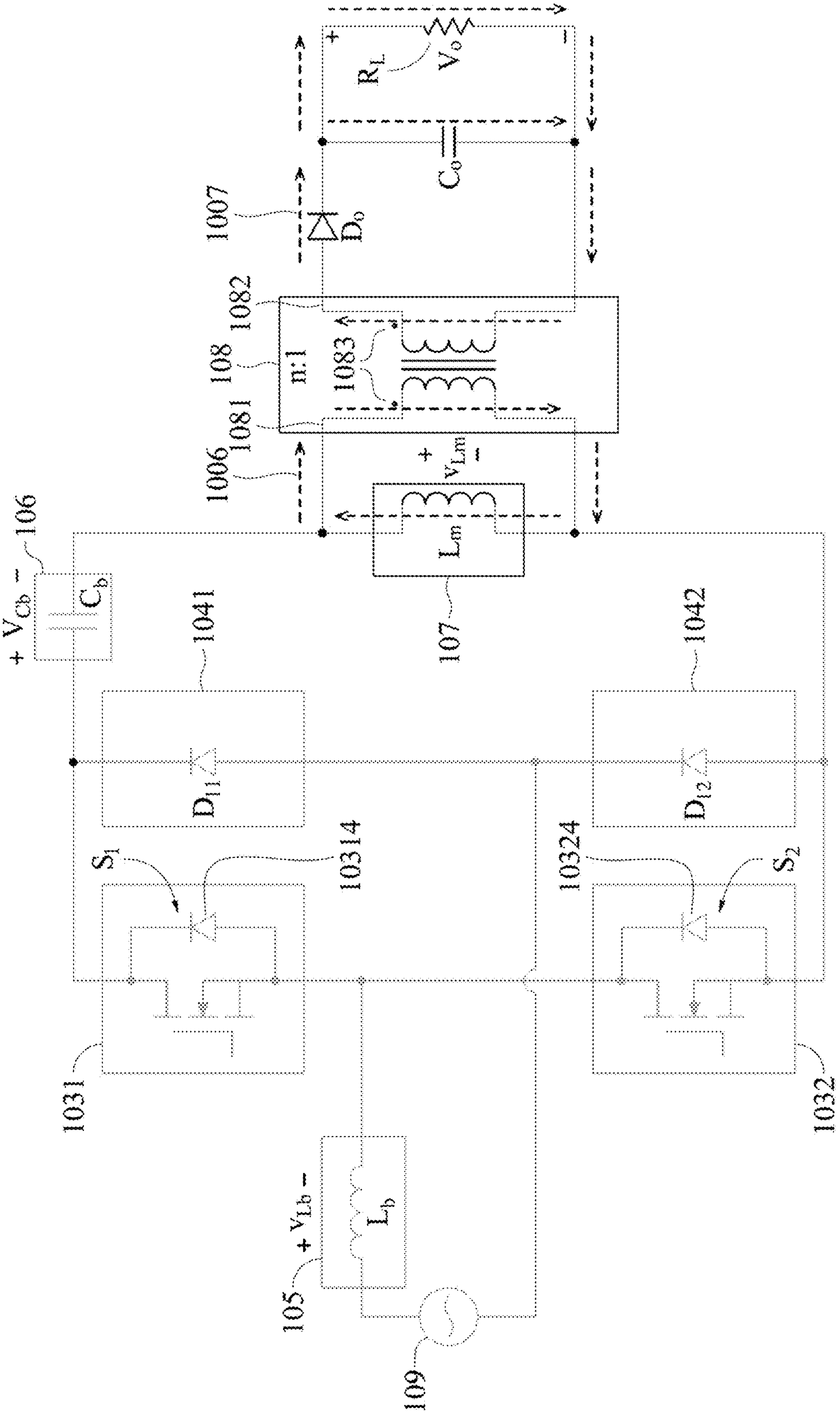

FIG. 10A to FIG. 10C are schematic diagrams of operation analysis of the conversion system according to an embodiment of the present invention. Refer to FIG. 2, FIG. 9, and FIG. 10A to FIG. 10C together. When the input voltage $V_{in}$ is in the negative half cycle, a value of the input voltage $V_{in}$ is $-V_i$. In the interval 903, it can be seen from a path 1001 (a loop formed by the input inductance element 105, the power supply 109, the first conduction element 1041, and the first switch 1031) and a path 1002 (a loop formed by the magnetizing inductance element 107, the main capacitor element 106, the first switch 1031, and the second switch 1032) in FIG. 10A, and the Kirchhoff Circuit Laws that $v_{Lb}=-Vi$ and $v_{Lm}=-V_{Cb}$, where the voltage $v_{Lb}$ is a voltage on the input inductance element 105. In the interval 904, it can be seen from a path 1003 (a loop formed by the input inductance element 105, the power supply 109, the first conduction element 1041, the main capacitor element 106, the magnetizing inductance element 107, and the internal diode 10324), a path 1004 (a loop formed by the magnetizing inductance element 107 and the primary side 1081), and a path 1005 (two loops formed by the secondary side 1082, the output diode Do, the output capacitor Co, and the output load resistor RL) in FIG. 10B, and the Kirchhoff Circuit Laws that $v_{Lb}=-V_i-V_{Cb}-nV_O$ and $vL_m=nV_O$, where $V_O$ is an output voltage of the conversion unit 101.

In an interval 906, only a path 1006 (a loop formed by the magnetizing inductance element 107 and the primary side 1081) and a path 1007 (two loops formed by the secondary side 1082, the output diode $D_O$, the output capacitor $C_O$, and the output load resistor RL) in FIG. 10C remain in operation. When the interval 906 ends, $v_{Lb}=0$ and $v_{Lm}=0$. From the volt second balance principle, it can be seen that $D_1 \cdot T_S \cdot (-V_i) + D_2 \cdot (-V_i - V_{Cb} - nV_0) = 0$. Therefore, it can be obtained that $$D_2 = \frac{-D_1 \cdot V_i}{V_{Cb} + nV_o + V_i}.$$

Figure 23:
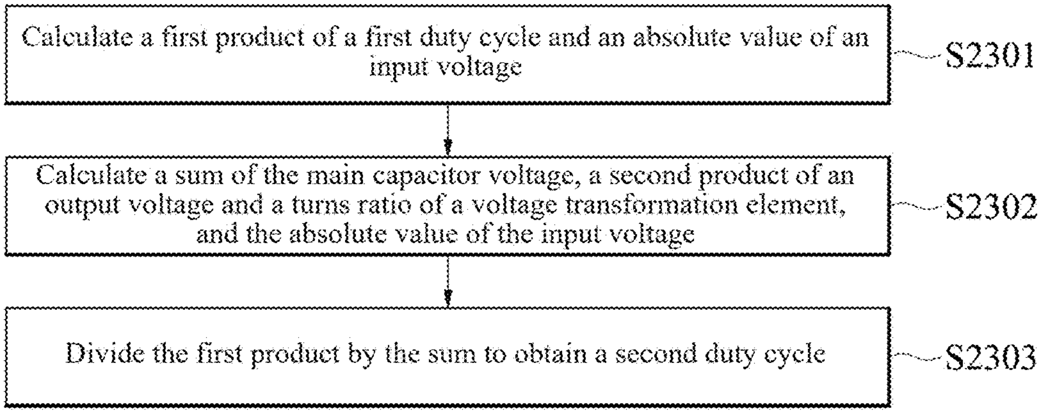
FIG. 23 is a flowchart of calculating a second duty cycle according to some embodiments of the present invention.

FIG. 23 is a flowchart of calculating a second duty cycle according to some embodiments of the present invention. Referring to FIG. 2, FIG. 4A, FIG. 5, FIG. 7, FIG. 9, FIG. 22, and FIG. 23 together, following the embodiment of FIG. 22, based on the foregoing analysis of FIG. 7, FIG. 8A to FIG. 8C, FIG. 9, and FIG. 10A to FIG. 10C, in the embodiment shown in FIG. 23, the foregoing step S2201 includes steps S2301 to S2303 performed by the second duty cycle calculation unit 1023. In step S2301, the second duty cycle calculation unit 1023 calculates a first product of the first duty cycle D1 and an absolute value $|V_{in}|$ of the input voltage $V_{in}$, where the first product is $D_1 \cdot |V_{in}|$ (when the input voltage Vin is in the positive half cycle, the absolute value $|V_{in}|$ of the input voltage $V_{in}$ is $V_i$, and when the input voltage Vin is in the negative half cycle, the absolute value $|V_{in}|$ of the input voltage $V_{in}$ is $-V_i$). In step S2302, the second duty cycle calculation unit 1023 calculates a sum of the main capacitor voltage $V_{Cb}$, a second product of the output voltage $V_O$ and the turns ratio n of the voltage transformation element 108, and a negative value of the absolute value $|V_{in}|$ of the input voltage Vin, where the sum is $V_{Cb}+nV_O-|V_{in}|$ (when the input voltage Vin is in the positive half cycle, the sum is $V_{Cb}+nV_O-V_i$, and when the input voltage Vin is in the negative half cycle, the sum is $V_{Cb}+nV_O+V_i$).

In step S2303, the second duty cycle calculation unit 1023 divides the calculated first product ($D_1 \cdot |V_{in}|$) by the sum ($V_{Cb}+nV_O-|V_{in}|$) to obtain a second duty cycle, where the second duty cycle is $$\frac{D_1 \cdot |V_{in}|}{V_{Cb} + nV_o - |V_{in}|}$$

(when the input voltage Vin is in the positive half cycle, the second duty cycle is $$\frac{D_1 \cdot V_i}{V_{Cb} + nV_o - V_i},$$

and when the input voltage Vin is in the negative half cycle, the second duty cycle is $$\left.\frac{-D_1 \cdot V_i}{V_{Cb} + nV_o + V_i}\right).$$

In some embodiments of the present invention, when calculating the second duty cycle, the second duty cycle calculation unit 1023 calculates the second duty cycle in the current switching interval based on the input voltage $V_{in}$, the main capacitor voltage $V_{Cb}$, and the output voltage $V_O$ that are detected at the start of the switching interval (for example, a time point tstart1 and a time point tstart2 in FIG. 7). In some embodiments of the present invention, before calculating the second duty cycle, the second duty cycle calculation unit 1023 may alternatively read the input voltage $V_{in}$, the main capacitor voltage $V_{Cb}$, and the output voltage $V_O$ that are currently detected, to calculate the second duty cycle.

Still referring to FIG. 1, FIG. 2, and FIG. 3, in some embodiments of the present invention, design specifications of the conversion system 100 recorded in FIG. 1, FIG. 2, and FIG. 3 are shown in Table (1) below, and specifications of circuit elements of the conversion system 100 recorded in FIG. 1, FIG. 2, and FIG. 3 are shown in Table (2) below.

TABLE 1

| | |
|---|---|
| Input voltage $V_{in}$ | 90 V/60 Hz to 264 V/50 Hz |
| Output voltage $V_O$ | 20 V |
| Output current | 3.25 A |
| Rated output power | 65 W |
| Switching frequency | 100 kHz |

TABLE 2

| | |
|---|---|
| Inductor $L_b$ of input inductance element 105 | 162 μh |
| Inductor $L_m$ of magnetizing inductance element 107 | 268.2 μh |
| Turns ratio of voltage transformation element 108 | 24:4 |
| Capacitor $C_b$ of the main capacitor element 106 | 68 μF/500 V |
| Output capacitor $C_O$ | 470 μF/35 V |
| Transistor $S_1$ and transistor $S_2$ | CGD65A055SH2 |
| Transistor $S_3$ and transistor $S_4$ | IPL60R060CFD7 |

Figure 11A:
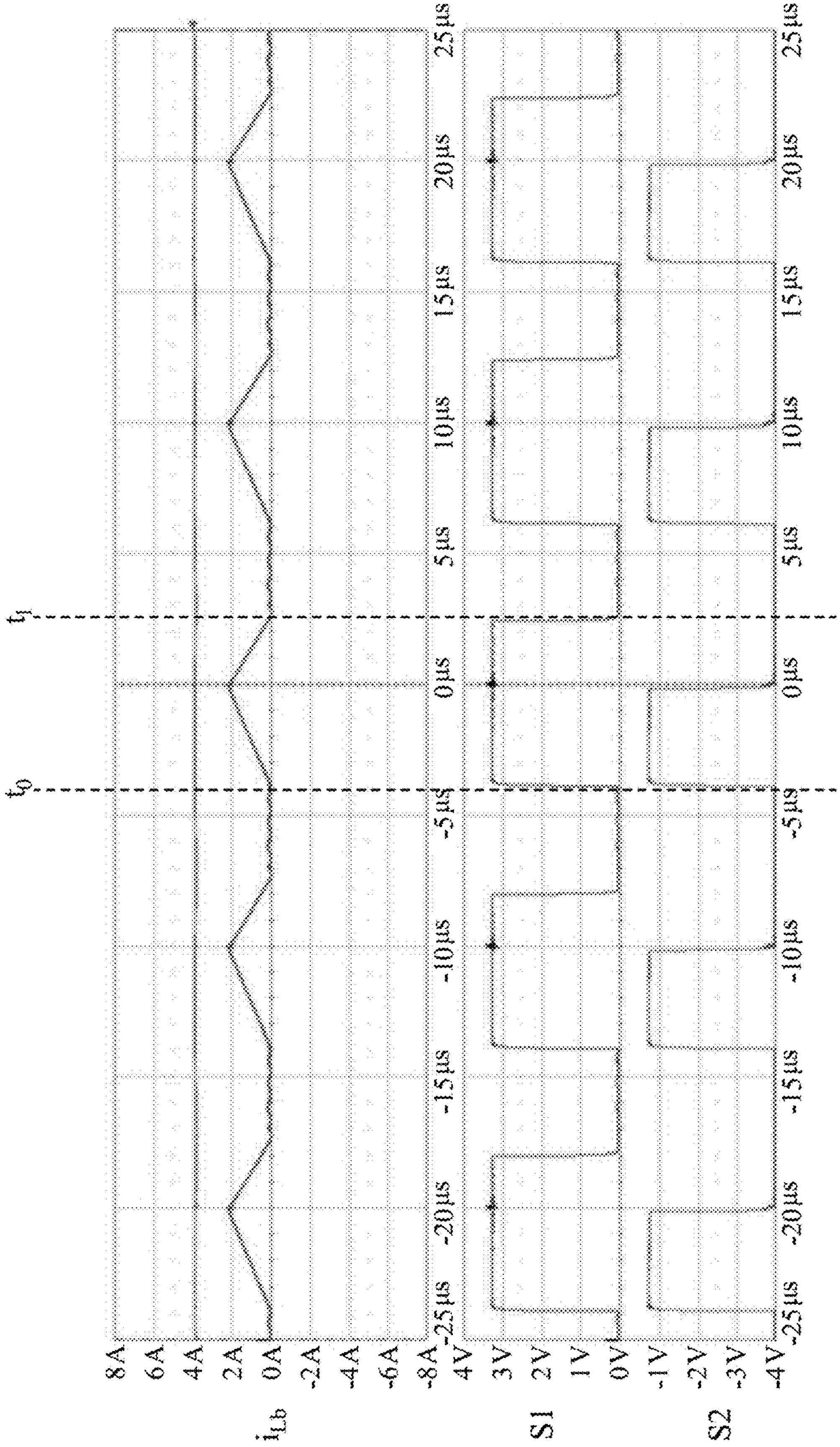
FIG. 11A and FIG. 11B are schematic diagrams of operation of the conversion system according to some embodiments of the present invention.
Figure 11B:
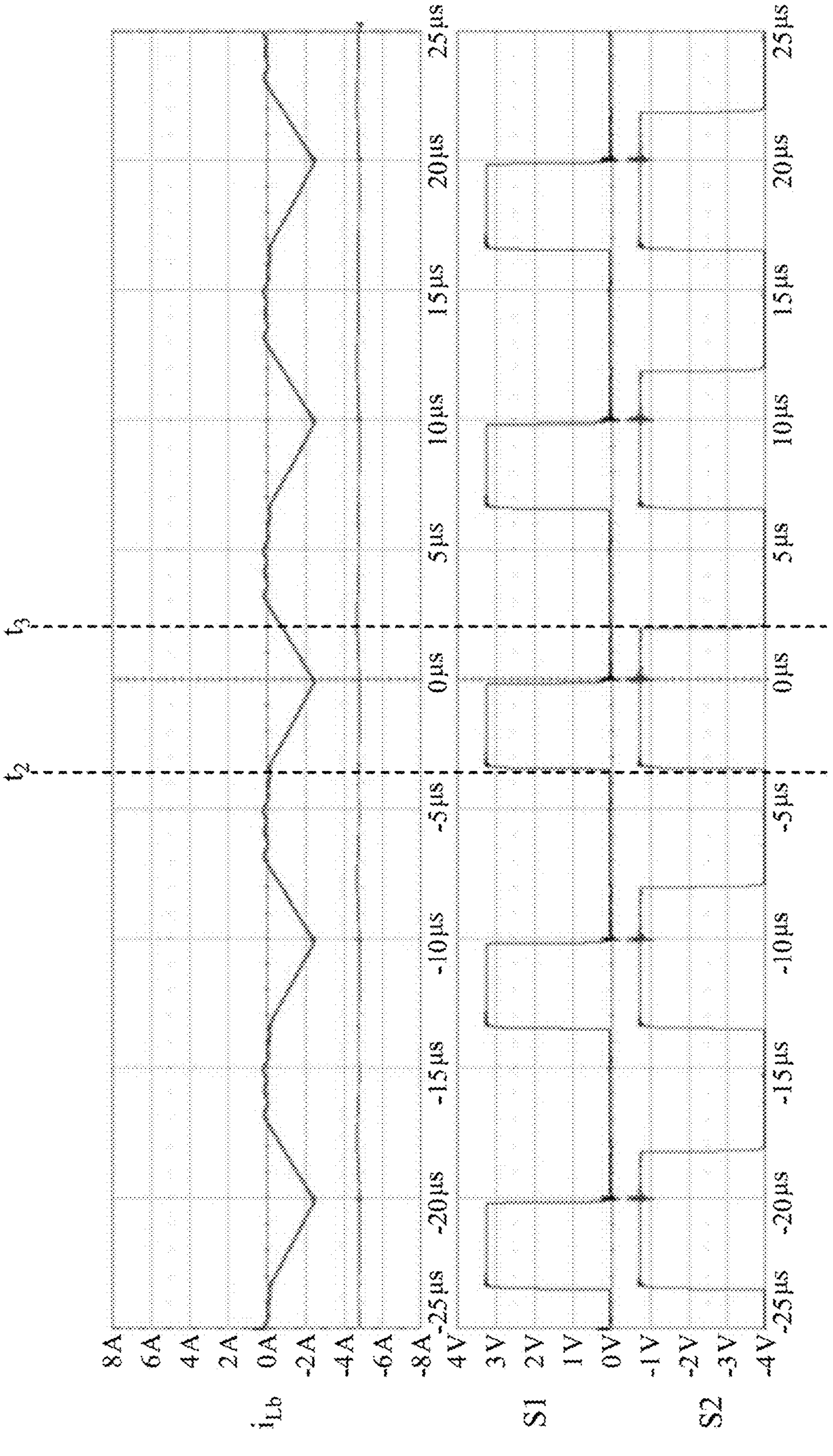

FIG. 11A and FIG. 11B are schematic diagrams of operation of the conversion system according to some embodiments of the present invention. Referring to FIG. 11A and FIG. 11B together, FIG. 11A and FIG. 11B are operating results of the conversion system 100 recorded in FIG. 1, FIG. 2, and FIG. 3 using the design specifications of Table (1) and the specifications of the circuit elements of Table (2) when the input voltage $V_{in}$ is 90 V/60 Hz and the load is a highest load output, and when the input voltage $V_{in}$ is in the positive half cycle and the input voltage $V_{in}$ is in the negative half cycle respectively. As shown in FIG. 11A, when the input voltage $V_{in}$ is in the positive half cycle, the first switch 1031 (transistor S1) starts to be turned on at a time point t0 and is turned off at a time point t1. At the time point t1, the current iLb drops to 0. As shown in FIG. 11B, when the input voltage $V_{in}$ is in the negative half cycle, the second switch 1032 (transistor S2) starts to be turned on at a time point $t_2$ and is turned off at a time point $t_3$. At the time point $t_3$, the current $i_{Lb}$ rises to 0.

Figure 12A:
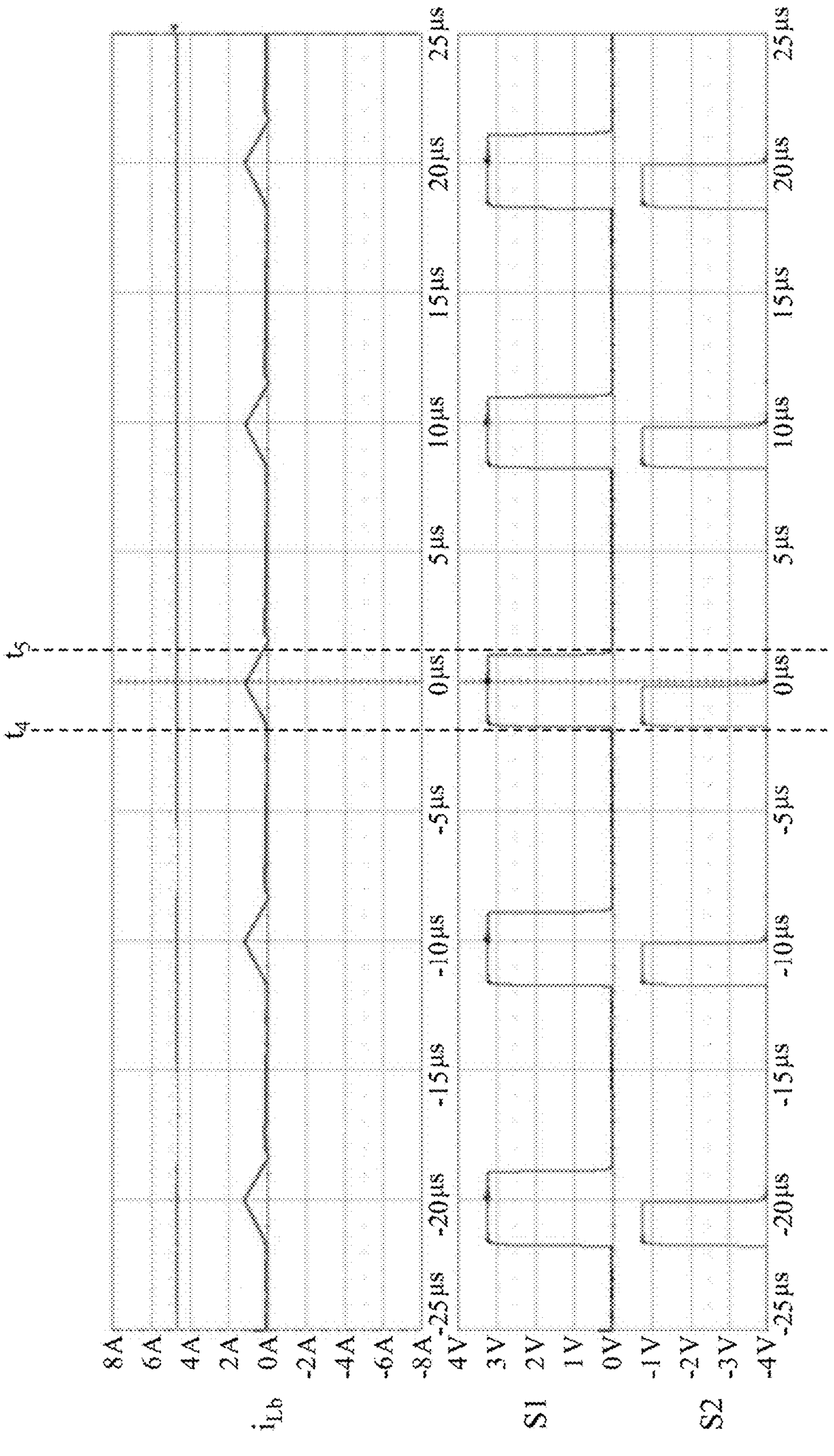
FIG. 12A and FIG. 12B are schematic diagrams of operation of the conversion system according to some embodiments of the present invention.
Figure 12B:
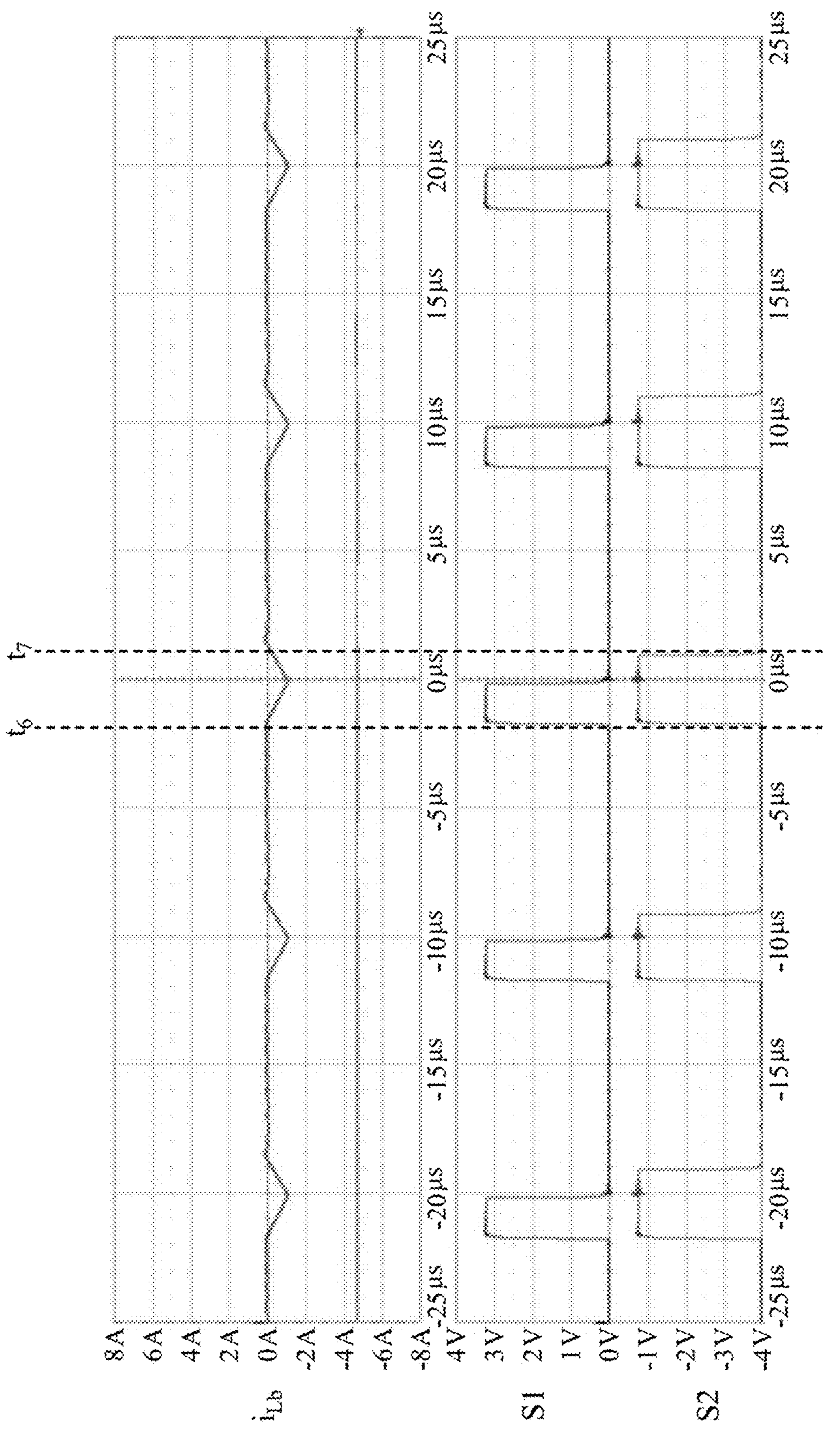

FIG. 12A and FIG. 12B are schematic diagrams of operation of the conversion system according to some embodiments of the present invention. Referring to FIG. 12A and FIG. 12B together, FIG. 12A and FIG. 12B are operating results of the conversion system 100 recorded in FIG. 1, FIG. 2, and FIG. 3 using the design specifications of Table (1) and the specifications of the circuit elements of Table (2) when the input voltage $V_{in}$ is 90 V/60 Hz and the load is a light load, and when the input voltage $V_{in}$ is in the positive half cycle and the input voltage $V_{in}$ is in the negative half cycle respectively. As shown in FIG. 12A, when the input voltage $V_{in}$ is in the positive half cycle, the first switch 1031 (transistor $S_1$) starts to be turned on at a time point $t_4$ and is turned off at a time point $t_5$. At the time point $t_5$, the current $i_{Lb}$ drops to 0. As shown in FIG. 12B, when the input voltage $V_{in}$ is in the negative half cycle, the second switch 1032 (transistor $S_2$) starts to be turned on at a time point $t_6$ and is turned off at a time point $t_7$. At the time point $t_7$, the current $i_{Lb}$ rises to 0.

Figure 13A:
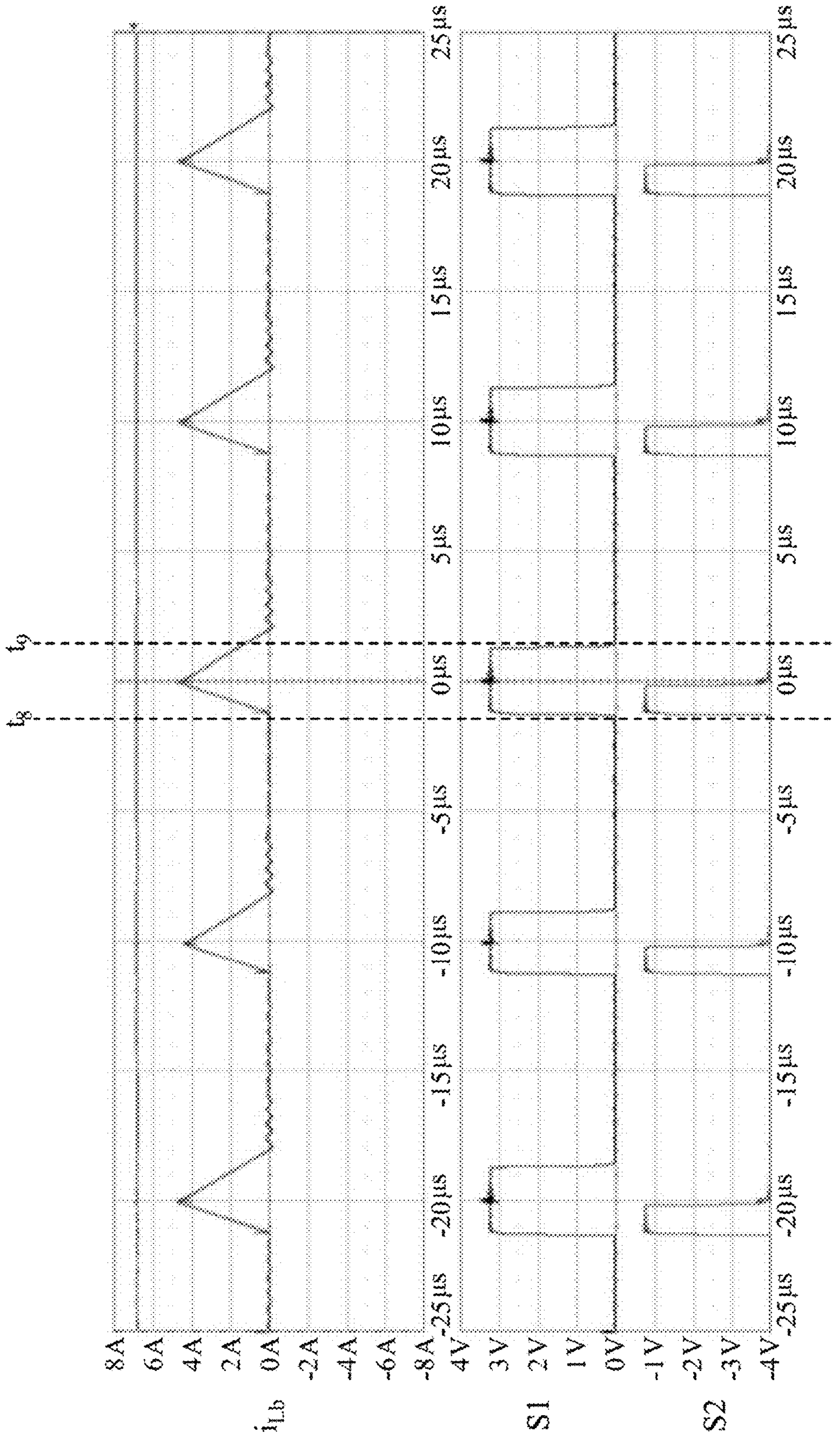
FIG. 13A and FIG. 13B are schematic diagrams of operation of the conversion system according to some embodiments of the present invention.
Figure 13B:
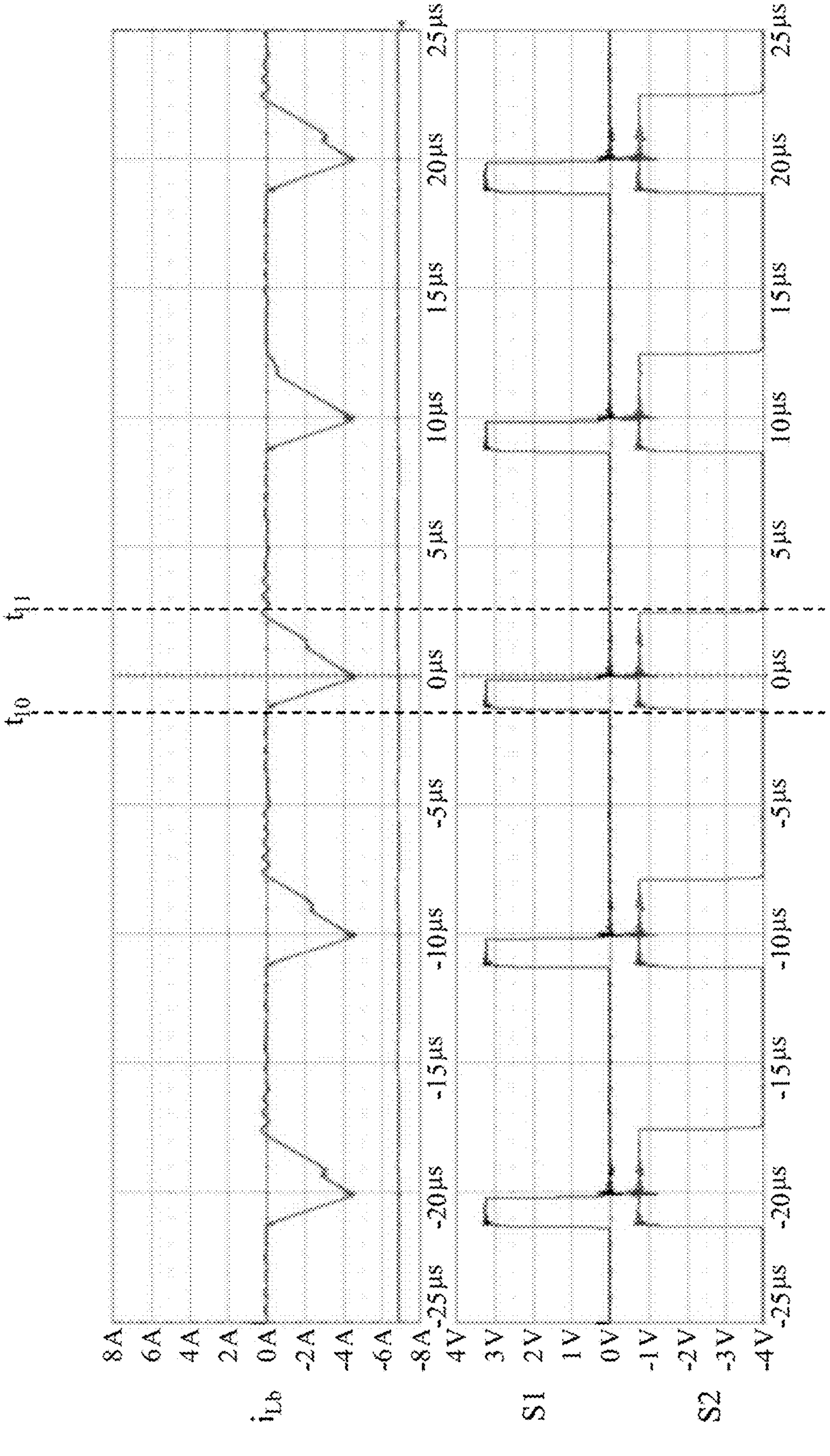

FIG. 13A and FIG. 13B are schematic diagrams of operation of the conversion system according to some embodiments of the present invention. Referring to FIG. 13A and FIG. 13B together, FIG. 13A and FIG. 13B are operating results of the conversion system 100 recorded in FIG. 1, FIG. 2, and FIG. 3 using the design specifications of Table (1) and the specifications of the circuit elements of Table (2) when the input voltage $V_{in}$ is 264 V/50 Hz and the load is a highest load output, and when the input voltage $V_{in}$ is in the positive half cycle and the input voltage $V_{in}$ is in the negative half cycle respectively. As shown in FIG. 13A, when the input voltage $V_{in}$ is in the positive half cycle, the first switch 1031 (transistor S1) starts to be turned on at a time point t8 and is turned off at a time point t9. At the time point t9, the current iLb drops to 0. As shown in FIG. 13B, when the input voltage $V_{in}$ is in the negative half cycle, the second switch 1032 (transistor S2) starts to be turned on at a time point t10 and is turned off at a time point t11. At the time point t11, the current $i_{Lb}$ rises to 0.

Figure 14A:
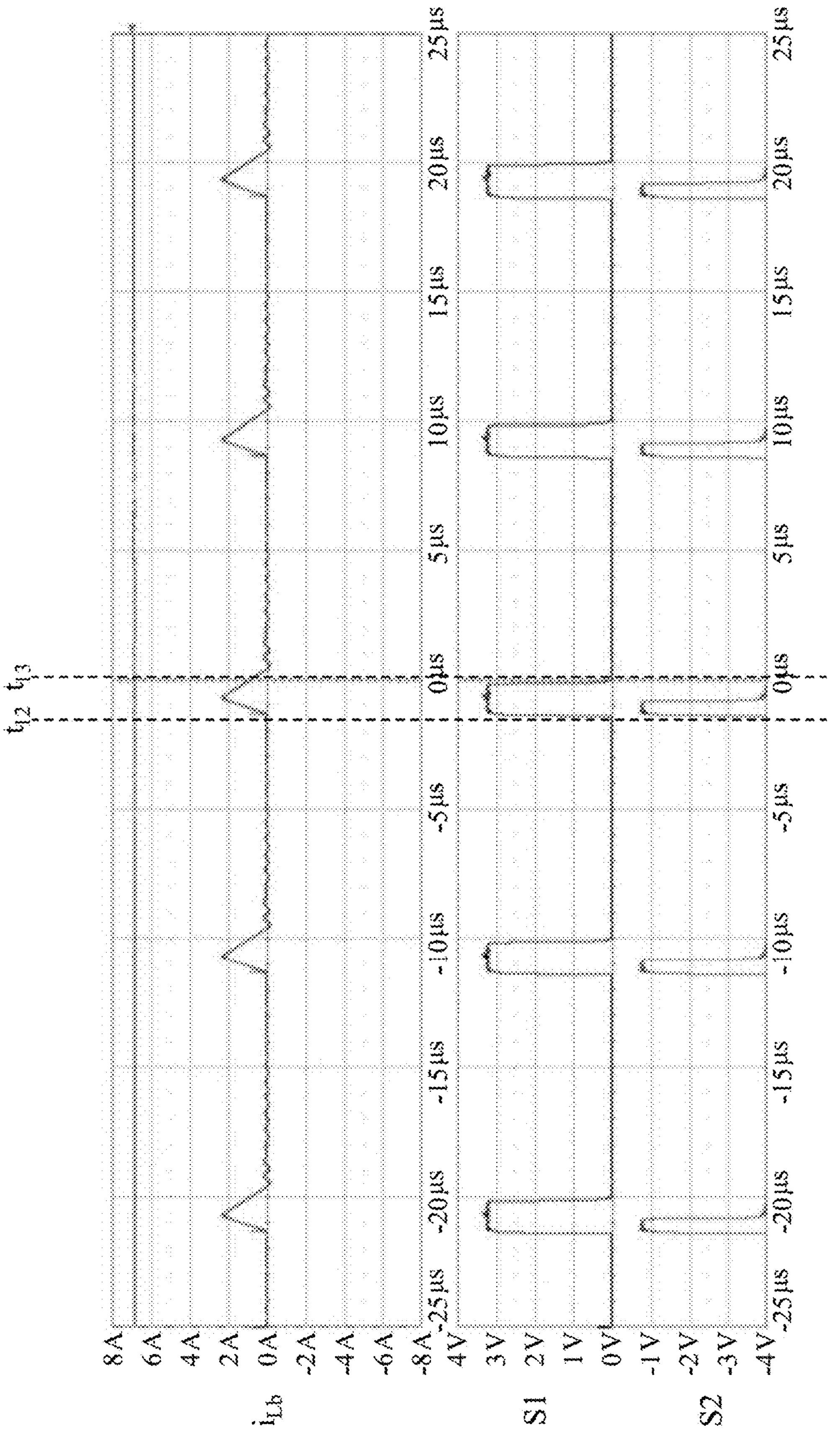
FIG. 14A and FIG. 14B are schematic diagrams of operation of the conversion system according to some embodiments of the present invention.
Figure 14B:
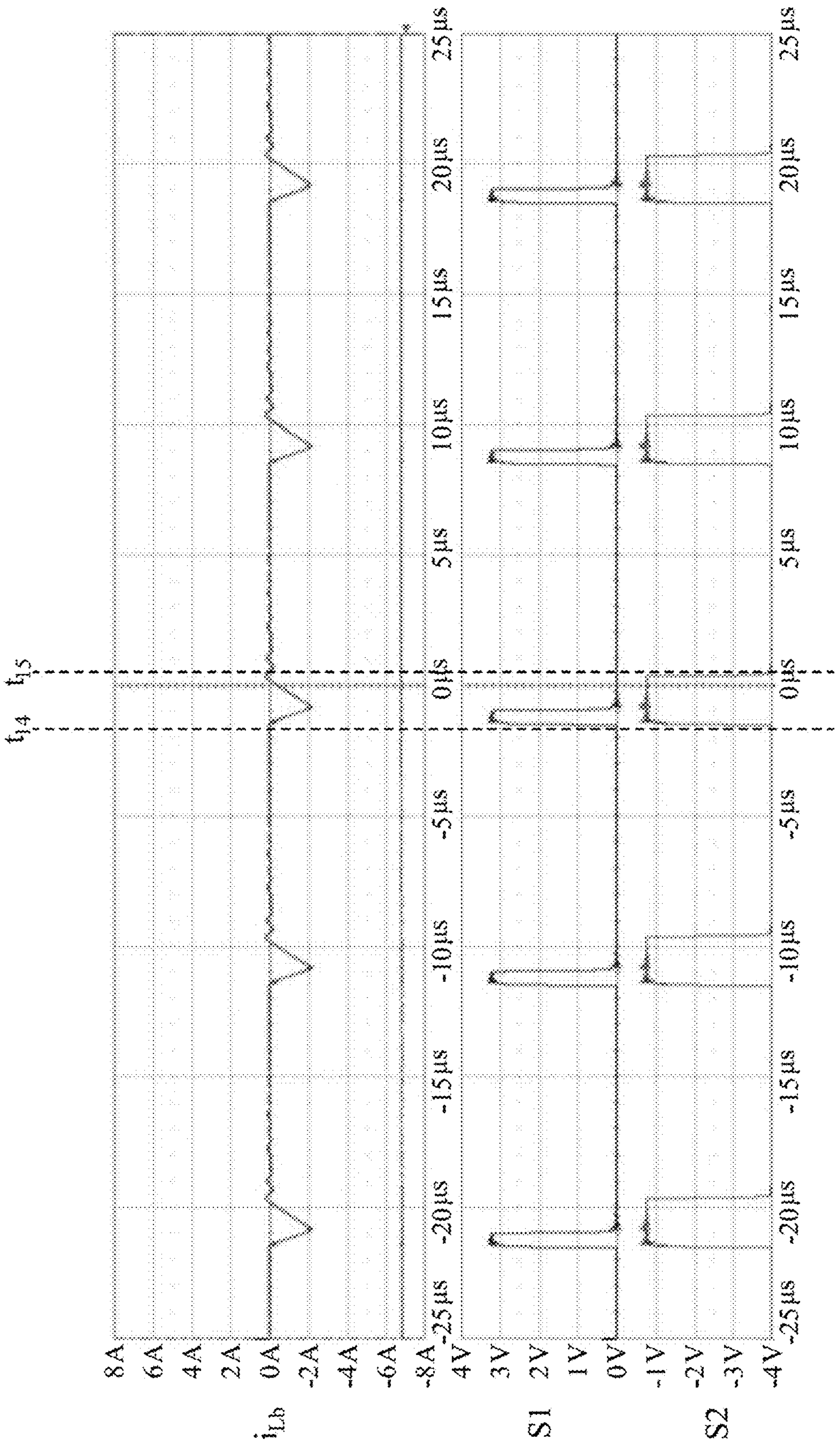

FIG. 14A and FIG. 14B are schematic diagrams of operation of the conversion system according to some embodiments of the present invention. Referring to FIG. 14A and FIG. 14B together, FIG. 14A and FIG. 14B are operating results of the conversion system 100 recorded in FIG. 1, FIG. 2, and FIG. 3 using the design specifications of Table (1) and the specifications of the circuit elements of Table (2) when the input voltage $V_{in}$ is 264 V/50 Hz and the load is a light load, and when the input voltage $V_{in}$ is in the positive half cycle and the input voltage $V_{in}$ is in the negative half cycle respectively. As shown in FIG. 14A, when the input voltage $V_{in}$ is in the positive half cycle, the first switch 1031 (transistor S1) starts to be turned on at a time point t12 and is turned off at a time point t13. At the time point t13, the current $i_{Lb}$ drops to 0. As shown in FIG. 14B, when the input voltage $V_{in}$ is in the negative half cycle, the second switch 1032 (transistor $S_2$) starts to be turned on at a time point $t_{14}$ and is turned off at a time point $t_{15}$. At the time point tis, the current $i_{Lb}$ rises to 0.

Figure 15A:
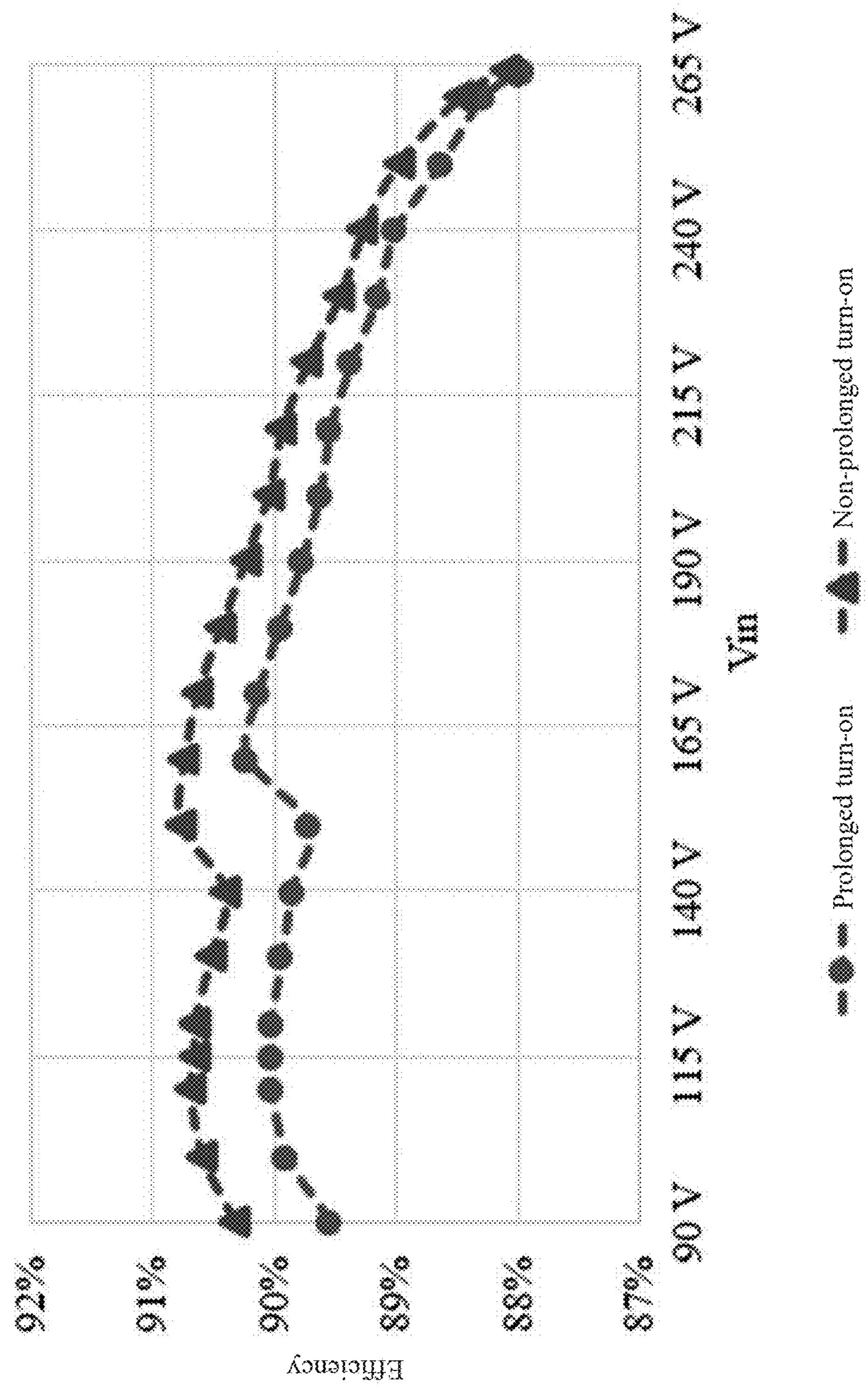
FIG. 15A is a diagram of efficiency comparison of the conversion system according to some embodiments of the present invention.

FIG. 15A is a diagram of efficiency comparison of the conversion system according to some embodiments of the present invention. As shown in FIG. 15A, when the foregoing turn-on prolonging technology is used, the maximum efficiency is improved by 1.06%, and the improvement effect is more significant when a low voltage is inputted.

Figure 15B:
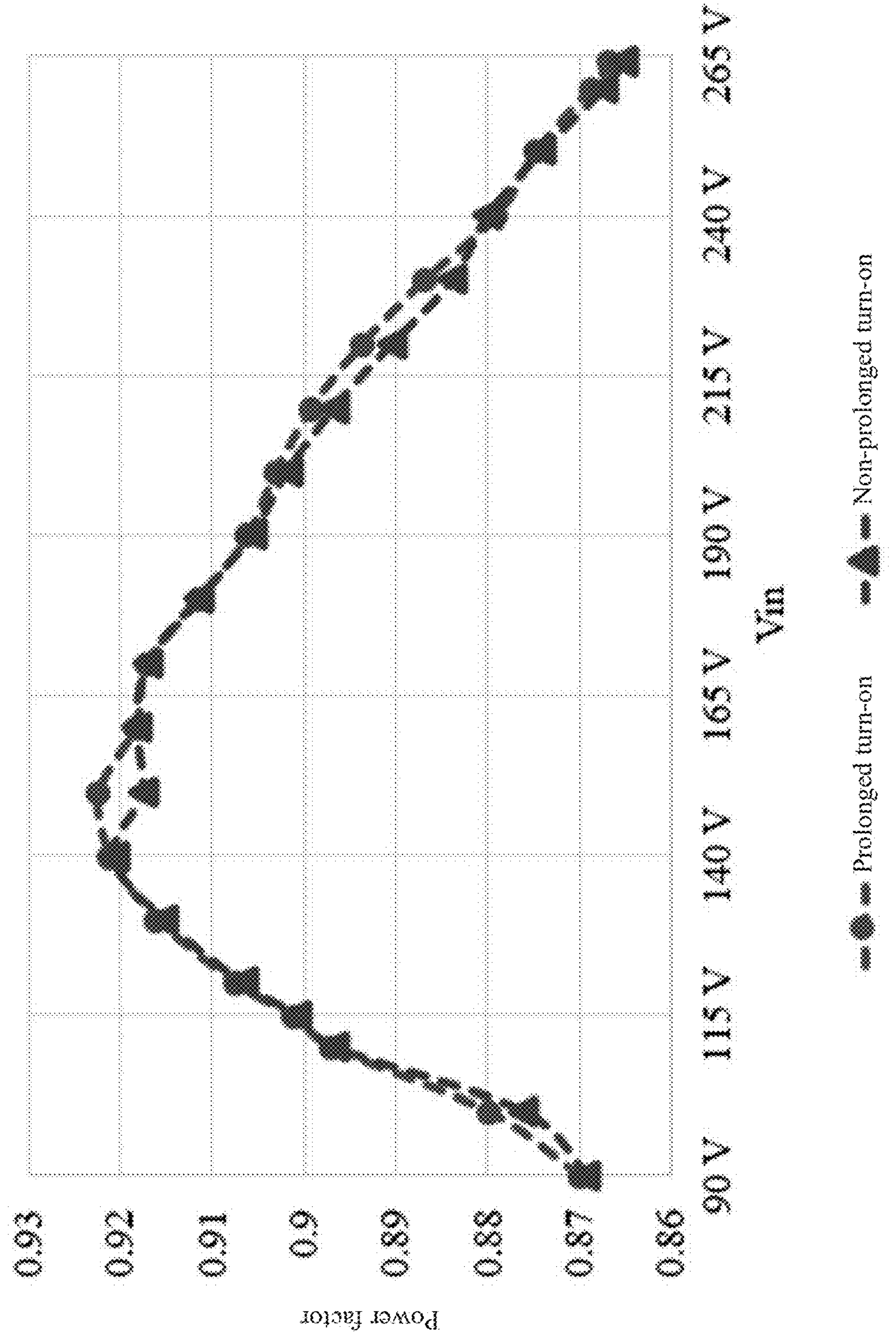
FIG. 15B is a diagram of power factor comparison of the conversion system according to some embodiments of the present invention.

FIG. 15B is a diagram of power factor comparison of the conversion system according to some embodiments of the present invention. As shown in FIG. 15B, a power factor of the conversion system 100 is similar to a result without using the turn-on prolonging technology.

Figure 16B:
FIG. 16A and FIG. 16B are schematic diagrams of a temperature of the conversion system according to some embodiments of the present invention.
Figure 16A:
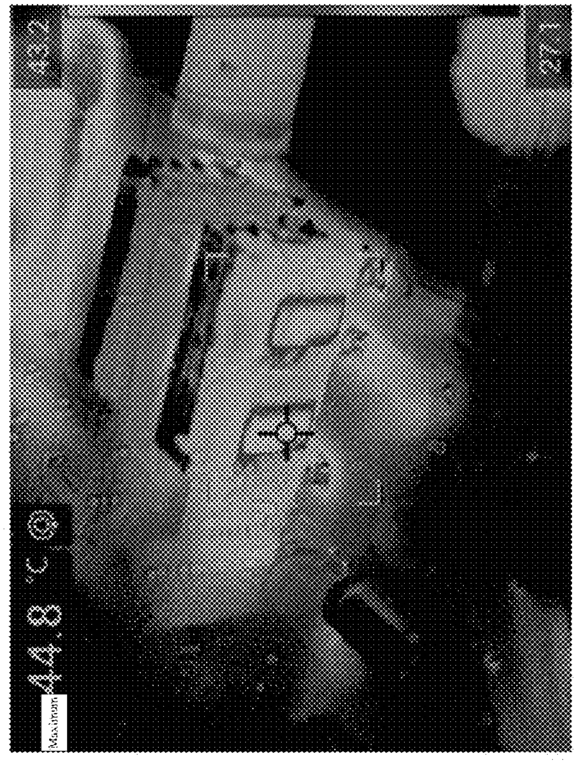

FIG. 16A is a schematic diagram of a temperature of the conversion system according to some embodiments of the present invention. FIG. 16B is a schematic diagram of a temperature of the conversion system according to some embodiments of the present invention. Referring to FIG. 16A and FIG. 16B together, the circuits in FIG. 16A and FIG. 16B use the design specifications in Table (1) and the specifications of the circuit elements in Table (2) for the conversion system 100 recorded in FIG. 1, FIG. 2, and FIG.

3. FIG. 16A is a schematic diagram of temperatures of the first switch 1031 and the second switch 1032 after the conversion system 100 operates for 15 minutes using the turn-on prolonging technology when the input voltage $V_{in}$ is 90 V/60 Hz and the load is a highest load output. FIG. 16B is a schematic diagram of temperatures of the first switch 1031 and the second switch 1032 after the conversion system 100 operates for 15 minutes without the turn-on prolonging technology when the input voltage $V_{in}$ is 90 V/60 Hz and the load is the highest load output. As shown in FIG. 16A and FIG. 16B, after 15 minutes of operation using the turn-on prolonging technology, maximum temperatures of the first switch 1031 and the second switch 1032 are 44.8° C. However, after 15 minutes of operation without using the turn-on prolonging technology, the maximum temperatures of the first switch 1031 and the second switch 1032 are 57.4° C., and the temperatures are improved by about 12.6° C.

Still referring to FIG. 4A, in some embodiments of the present invention, the foregoing step S2101 includes the following first step and second step performed by the first duty cycle calculation unit 1022. In the first step, the first duty cycle calculation unit 1022 receives the output voltage detection signal $V_{O\_fb}$, obtains the output voltage $V_O$ of the conversion unit 101 based on the output voltage detection signal $V_{O\_fb}$, and subtracts the output voltage $V_O$ from a reference voltage $V_f$ to obtain a voltage error $V_e$ between the reference voltage $V_f$ and the output voltage $V_O$ of the conversion unit 101, where $V_e=V_f-V_O$. In the second step, the first duty cycle calculation unit 1022 converts the voltage error Ve into the first duty cycle D1 based on a control algorithm.

In some embodiments of the present invention, the control algorithm is a proportional-integral algorithm.

Figure 17:
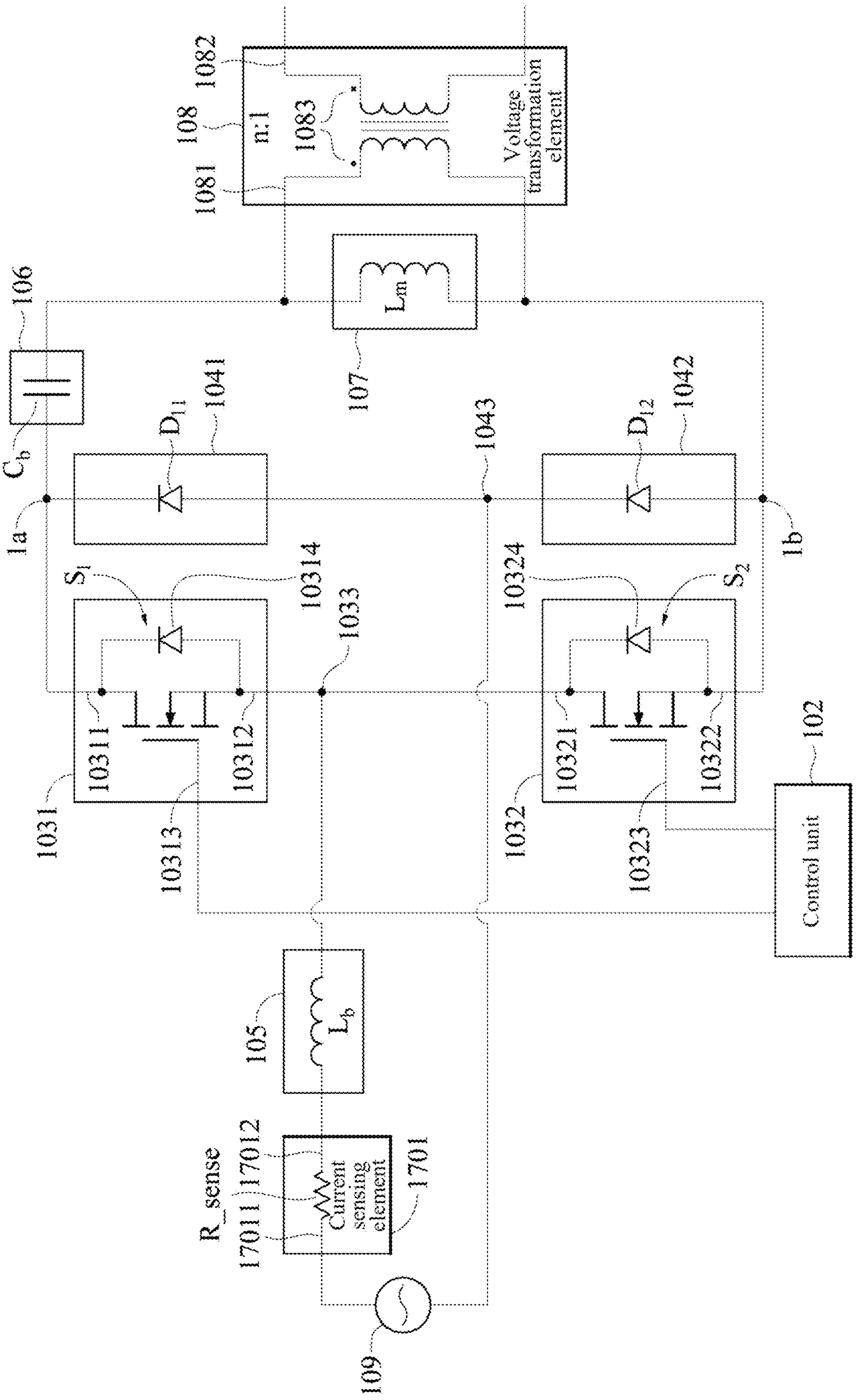
FIG. 17 is a circuit diagram of the conversion system according to an embodiment of the present invention.
Figure 18:
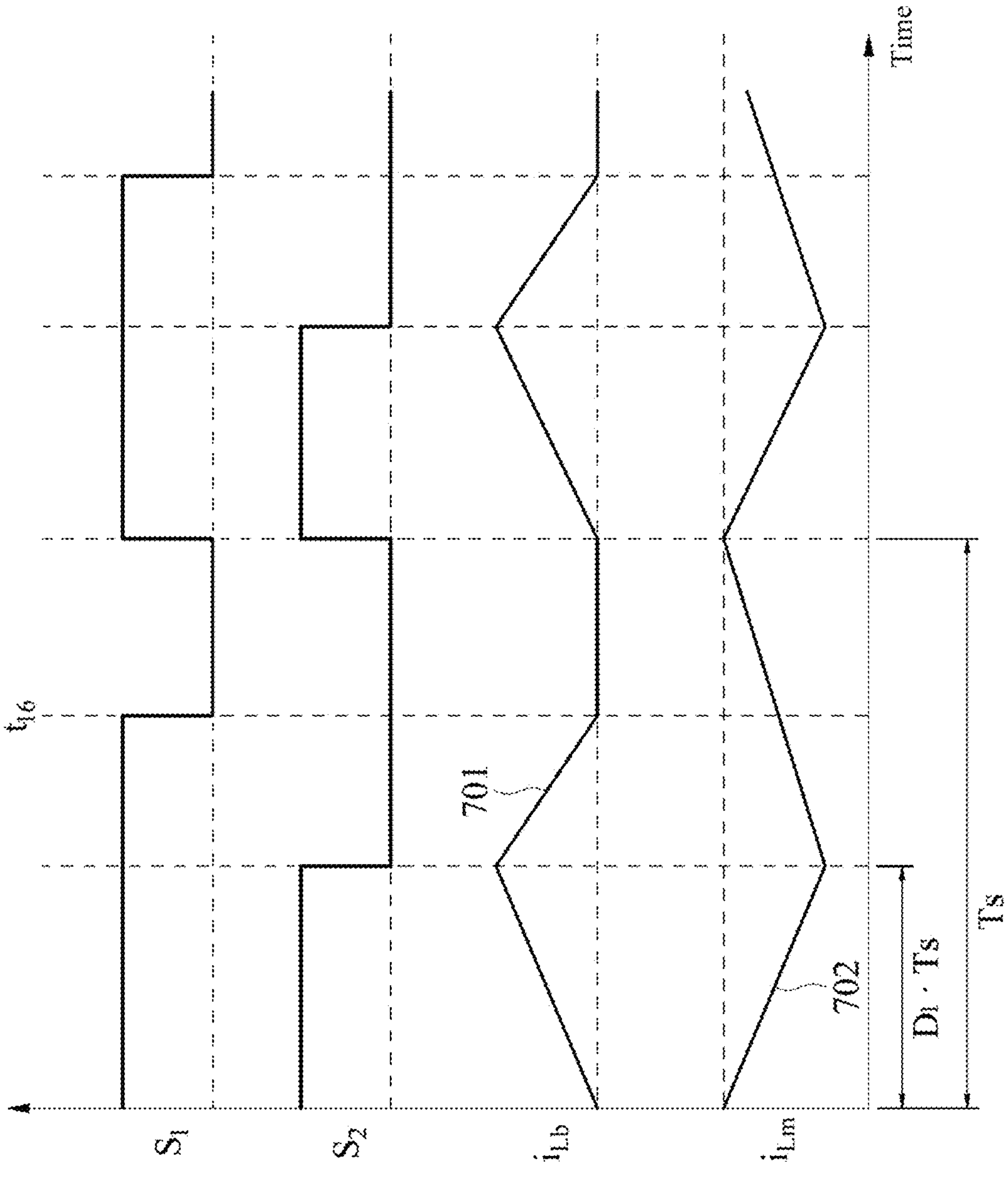
FIG. 18 is a schematic diagram of switch-controlled timing according to an embodiment of the present invention.
Figure 19:
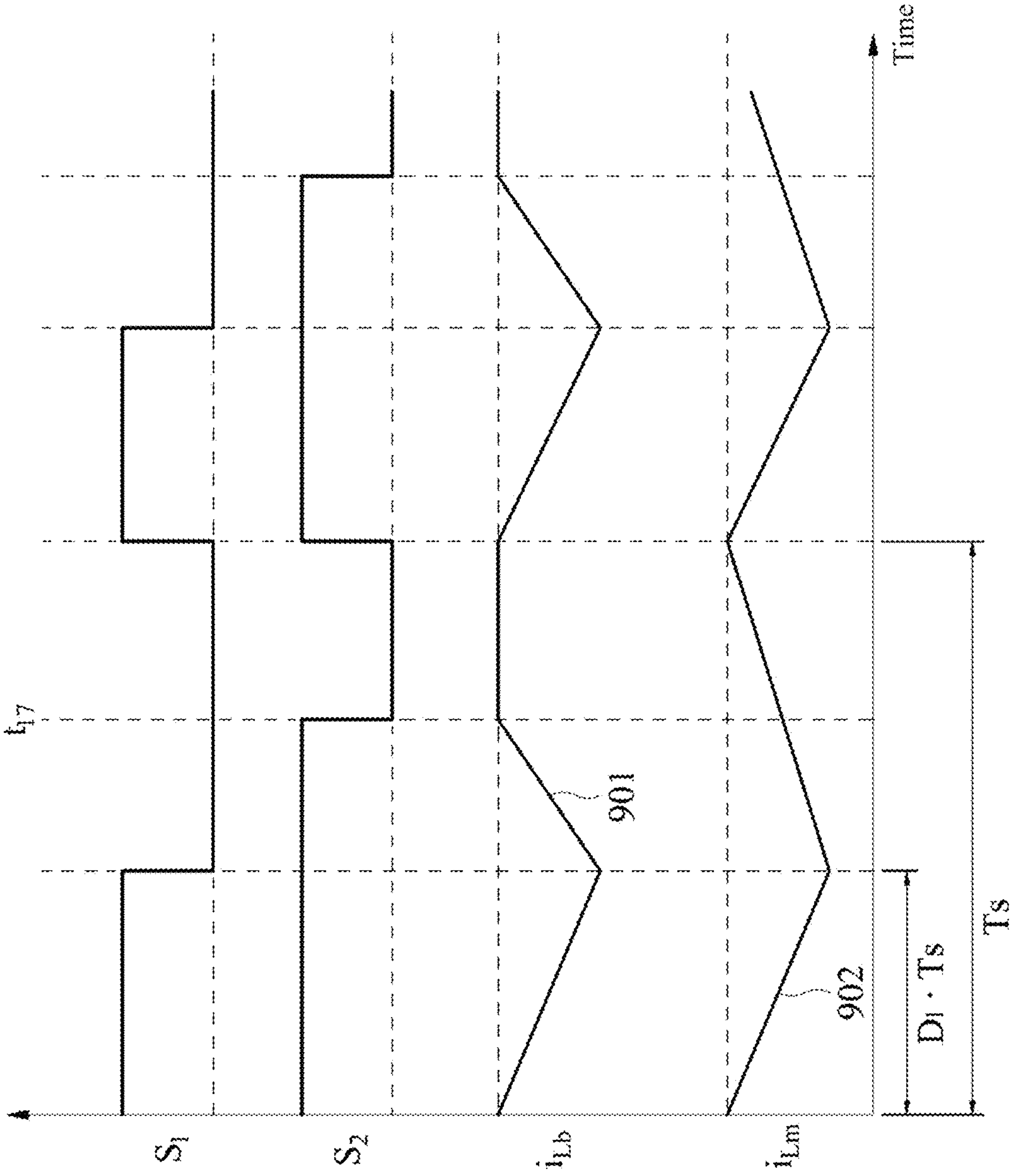
FIG. 19 is a schematic diagram of switch-controlled timing according to an embodiment of the present invention.
Figure 24:
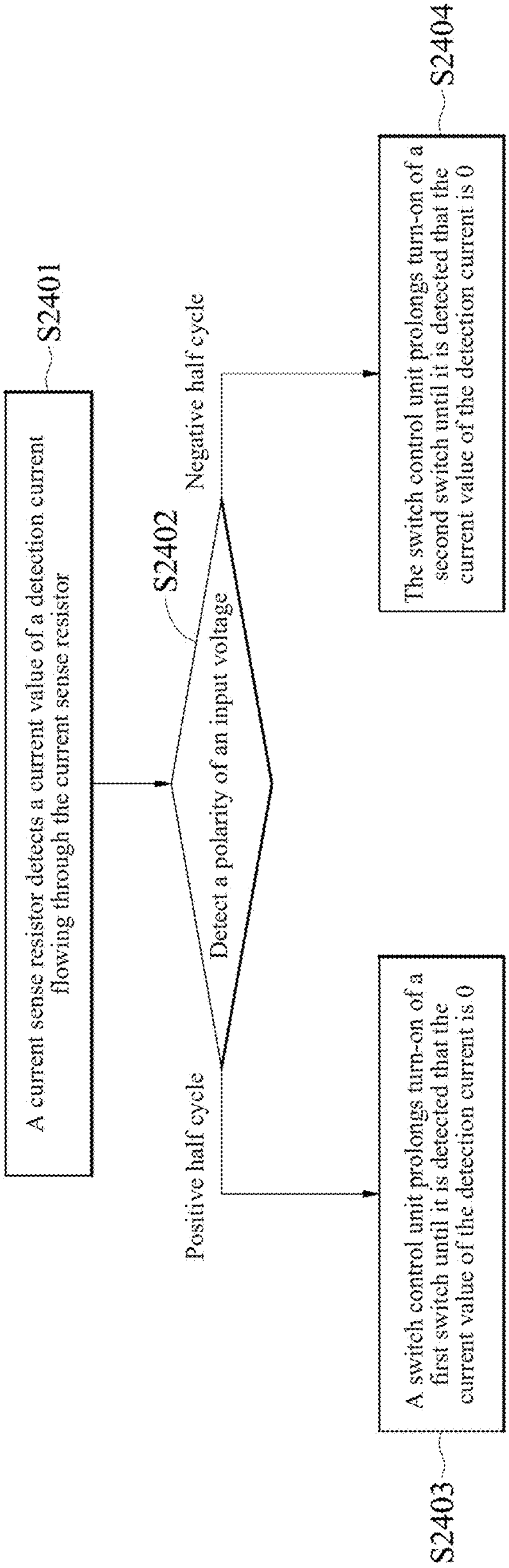
FIG. 24 is a flowchart of the conversion method according to some embodiments of the present invention.

FIG. 17 is a circuit diagram of the conversion system according to an embodiment of the present invention. FIG. 18 is a schematic diagram of switch-controlled timing according to an embodiment of the present invention. FIG. 19 is a schematic diagram of switch-controlled timing according to an embodiment of the present invention. FIG. 24 is a flowchart of the conversion method according to some embodiments of the present invention. First, referring to FIG. 2 and FIG. 17 together, compared with FIG. 2, FIG. 17 includes a current sensing element 1701. The current sensing element 1701 includes a current sense resistor R_sense. The current sense resistor R_sense includes a first end 17011 and a second end 17012. The first end 17011 of the current sense resistor R_sense is configured to be coupled to the power supply 109, and the second end 17012 of the current sense resistor R_sense is coupled to the input inductance element 105. Referring to FIG. 17, FIG. 18, FIG. 19, and FIG. 24 together, in this embodiment, the foregoing step S2103 includes S2401 to S2404. In step S2401, the control unit 102 detects, through the current sense resistor R_sense, a current value of a detection current flowing through the current sense resistor R_sense to detect the current $i_{Lb}$. In step S2402, the control unit 102 detects the polarity of the input voltage $V_{in}$ generated by the power supply 109. If the input voltage is in the positive half cycle, perform step S2403. If the input voltage is in the negative half cycle, perform step S2404.

In step S2403, the switch control unit 1024 prolongs the turn-on of the first switch 1031 in response to the input voltage $V_{in}$ being in the positive half cycle until it is detected that the current value of the detection current is 0. It should be noted that when the control unit 102 detects that the current value of the detection current is 0, the current $i_{Lb}$ also drops to 0. As shown in FIG. 18, at a time point t16, the control unit 102 detects that the current value of the detection current is 0, and the switch control unit 1024 stops the turn-on of the first switch 1031. In step S2404, the switch control unit 1024 prolongs the turn-on of the second switch 1032 in response to the input voltage $V_{in}$ being in the negative half cycle until it is detected that the current value of the detection current is 0. Similarly, when the control unit 102 detects that the current value of the detection current is 0, the current $i_{Lb}$ also rises to 0. As shown in FIG. 19, at a time point $t_{17}$, the control unit 102 detects that the current value of the detection current is 0, and the switch control unit 1024 stops the turn-on of the second switch 1032.

Figure 20A:
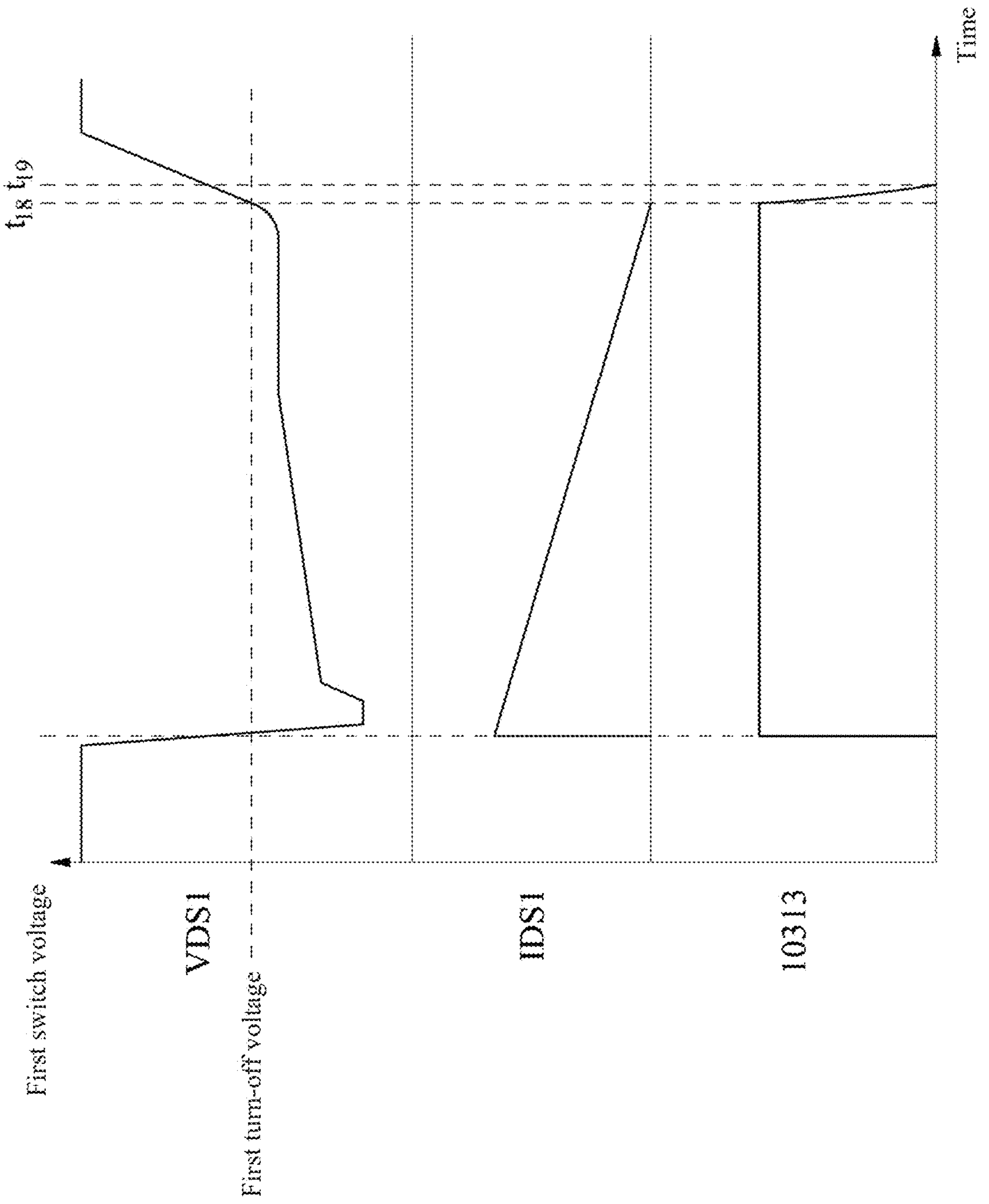
FIG. 20A is a schematic diagram of an operation of a first switch according to some embodiments of the present invention.
Figure 20B:
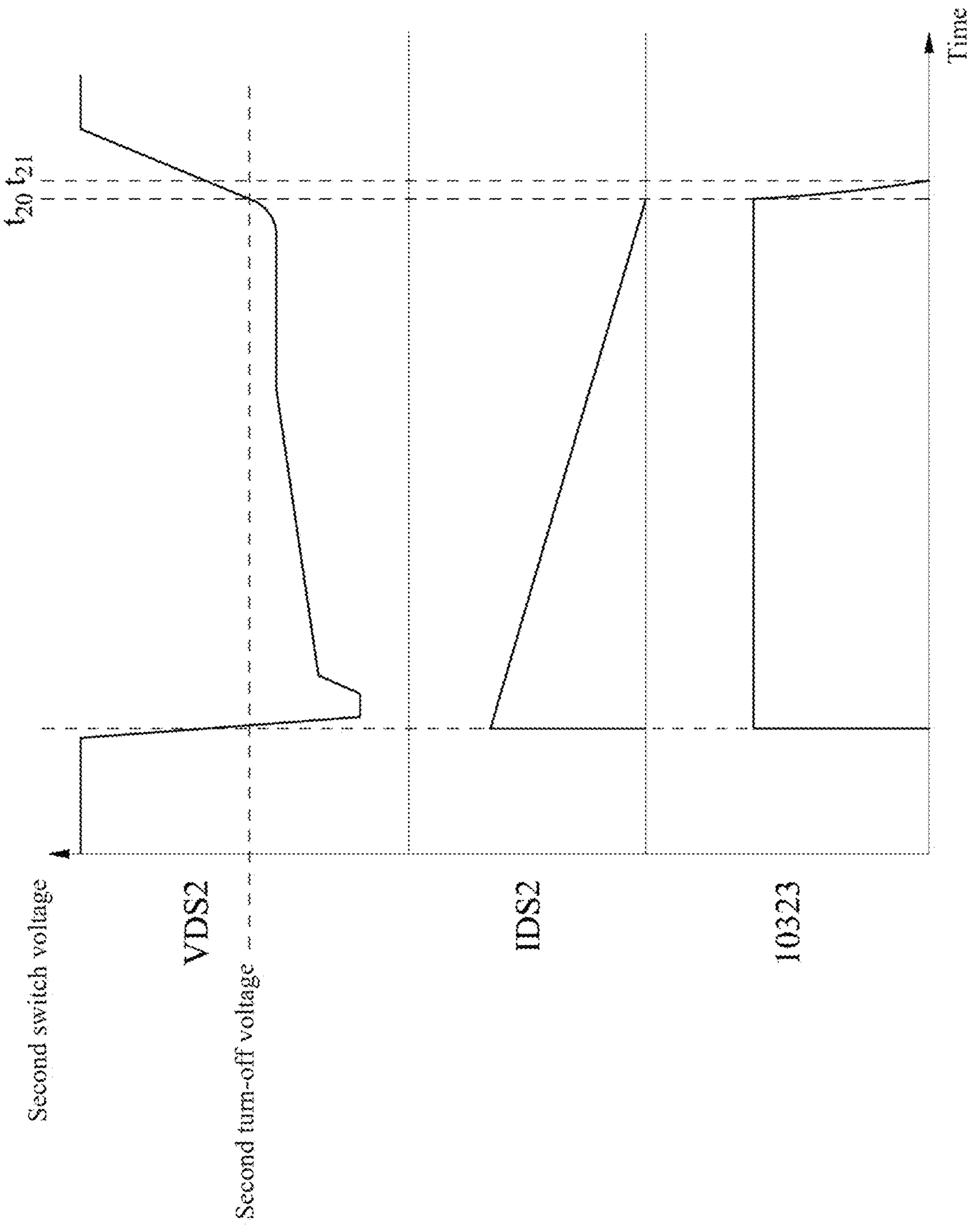
FIG. 20B is a schematic diagram of an operation of a second switch according to some embodiments of the present invention.
Figure 25:
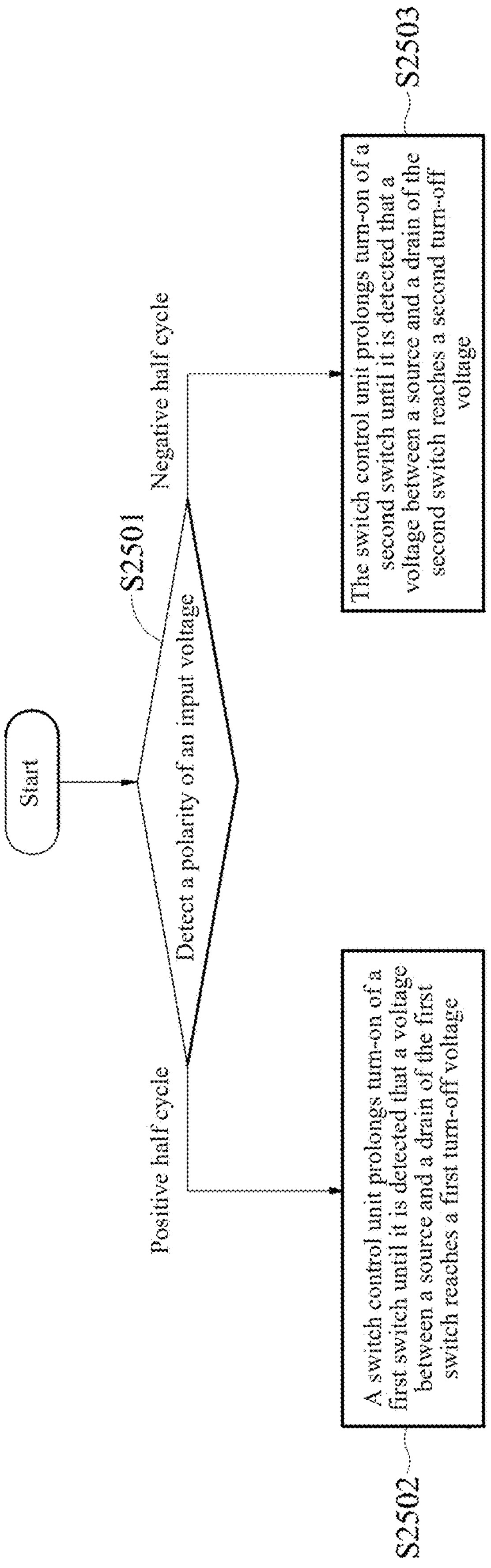
FIG. 25 is a flowchart of the conversion method according to some embodiments of the present invention.

FIG. 20A is a schematic diagram of an operation of a first switch according to some embodiments of the present invention. FIG. 20B is a schematic diagram of an operation of a second switch according to some embodiments of the present invention. FIG. 25 is a flowchart of the conversion method according to some embodiments of the present invention. Referring to FIG. 2, FIG. 20A, FIG. 20B, and FIG. 25 together, in some embodiments of the present invention, the first switch 1031 (transistor $S_1$) and the second switch 1032 (transistor $S_2$) are N-Channel MOSFETs (NMOSs). In this embodiment, the control unit 102 detects a time point at which the current $i_{Lb}$ changes to 0 by detecting a voltage VDS1 between a source and a drain of the transistor $S_1$ when the input voltage $V_{in}$ is in the positive half cycle and detecting a voltage VDS2 between a source and a drain of the transistor $S_2$ when the input voltage $V_{in}$ is in the negative half cycle. As shown in FIG. 8B, when the input voltage $V_{in}$ is in the positive half cycle, after the second switch 1032 (transistor S2) is turned off, a current IDS1 flowing between the source and the drain of the first switch 1031 (transistor $S_1$) is equal to the current $i_{Lb}$. As shown in FIG. 10B, when the input voltage $V_{in}$ is in the negative half cycle, after the first switch 1031 (transistor S1) is turned off, a current IDS2 flowing between the source and the drain of the second switch 1032 (transistor S2) is equal to the current $i_{Lb}$. Because there is a correspondence between a voltage between a source and a drain of the NMOS and a flowing current, when the input voltage $V_{in}$ is in the positive half cycle, after the second switch 1032 (transistor $S_2$) is turned off, the control unit 102 can learn whether the current $i_{Lb}$ drops to 0 only by detecting whether the voltage VDS1 between the drain and the source of the first switch 1031 (transistor $S_1$) reaches a first turn-off voltage corresponding to the current flowing through the source and the drain being 0. Similarly, when the input voltage $V_{in}$ is in the negative half cycle, after the first switch 1031 (transistor S1) is turned off, the control unit 102 can learn whether the current $i_{Lb}$ rises to 0 only by detecting whether the voltage VDS2 between the drain and the source of the second switch 1032 (transistor S2) reaches a second turn-off voltage corresponding to the current flowing through the source and the drain being 0.

In this embodiment, the foregoing step S2103 includes S2501 to S2503. In step S2501, the control unit 102 detects the polarity of the input voltage $V_{in}$ generated by the power supply 109. If the input voltage is in the positive half cycle, perform step S2502. If the input voltage is in the negative half cycle, perform step S2503.

In step S2502, the switch control unit 1024 prolongs the turn-on of the first switch 1031 (transistor $S_1$) in response to the input voltage $V_{in}$ being in the positive half cycle until it is detected that the voltage VDS1 between the drain and the source of the first switch 1031 (transistor $S_1$) reaches the first turn-off voltage. As shown in FIG. 20A, at a time point t18, the voltage VDS1 between the drain and the source of the first switch 1031 (transistor $S_1$) reaches the first turn-off voltage. In this case, the current flowing through the source and the drain is 0, and therefore, the current $i_{Lb}$ drops to 0. The switch control unit 1024 transmits a low-voltage signal to the third end 10313 of the first switch 1031 (the gate of the transistor $S_1$) at the time point tis. As shown in FIG. 20A, the low-voltage signal received by the third end 10313 of the first switch 1031 (the gate of the transistor S1) completely drops to 0 at a time point $t_{19}$ due to a physical limitation.

In step S2503, the switch control unit 1024 prolongs the turn-on of the second switch 1032 (transistor $S_2$) in response to the input voltage $V_{in}$ being in the negative half cycle until it is detected that the voltage between the drain and the source of the second switch 1032 (transistor $S_2$) reaches the second turn-off voltage. As shown in FIG. 20B, at a time point $t_{20}$, the voltage VDS2 between the drain and the source of the second switch 1032 (transistor $S_2$) reaches the second turn-off voltage. In this case, the current flowing through the source and the drain is 0, and therefore, the current $i_{Lb}$ rises to 0. The switch control unit 1024 transmits a low-voltage signal to the third end 10323 of the second switch 1032 (the gate of the transistor $S_2$) at the time point $t_{20}$. As shown in FIG. 20B, the low-voltage signal received by the third end 10323 of the second switch 1032 (the gate of the transistor $S_2$) completely drops to 0 at a time point $t_{21}$ due to a physical limitation.

Figure 26:
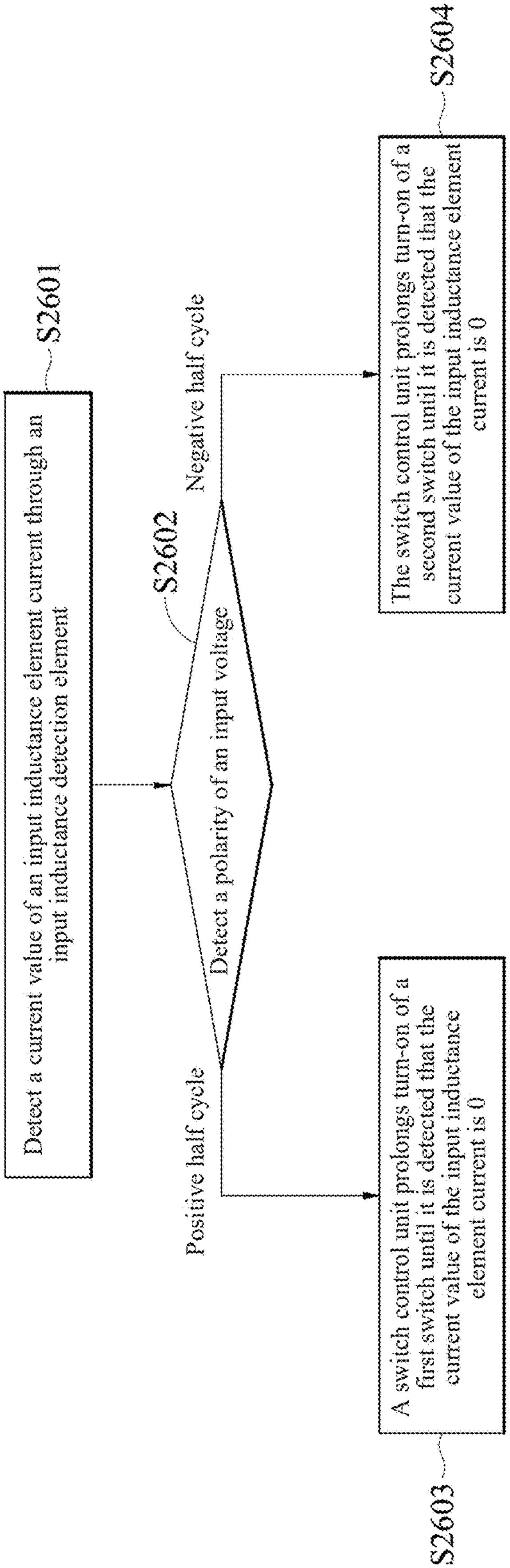
FIG. 26 is a flowchart of the conversion method according to some embodiments of the present invention.

FIG. 26 is a flowchart of the conversion method according to some embodiments of the present invention. Referring to FIG. 2 and FIG. 26 together, in the foregoing embodiments of FIG. 24 and FIG. 25, the current $i_{Lb}$ is detected by detecting the current value of the detection current flowing through the current sense resistor R_sense and the voltage between the source and the drain of the first switch 1031 (transistor $S_1$) and the second switch 1032 (transistor $S_2$) respectively. In the embodiment of FIG. 26, the control unit 102 directly detects the current $i_{Lb}$ (referred to as an input inductance element current below for ease of description) flowing through the input inductance element 105 by using an input inductance detection element. In this embodiment, the foregoing step S2103 includes S2601 to S2604. In step S2601, the control unit 102 detects a current value of an input inductance element current through the input inductance detection element. In step S2602, the control unit 102 detects the polarity of the input voltage $V_{in}$ generated by the power supply 109. If the input voltage is in the positive half cycle, perform step S2603. If the input voltage is in the negative half cycle, perform step S2604. In step S2603, the switch control unit 1024 prolongs the turn-on of the first switch 1031 in response to the input voltage $V_{in}$ being in the positive half cycle until it is detected that the current value of the input inductance element current is 0. In step S2604, the switch control unit 1024 prolongs the turn-on of the second switch 1032 in response to the input voltage $V_{in}$ being in the negative half cycle until it is detected that the current value of the input inductance element current is 0.

It should be noted that, the foregoing inductance detection element that detects the current iLb flowing through the input inductance element 105 may use a technology such as DCR sensing or differential current sensing.

Based on the above, in the conversion system provided in some embodiments of the present invention, due to the use of a single-stage bridgeless architecture for directly processing an alternating current input voltage by the first bridge arm and the second bridge arm, the conversion system has advantages such as a simple circuit structure and high conversion efficiency. According to the conversion system and the conversion method provided in some embodiments of the present invention, the maximum efficiency is improved and the temperature of the switch is reduced due to the use of the turn-on prolonging technology.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A conversion system, comprising:

a conversion unit, comprising:

a first bridge arm, comprising a first switch and a second switch that are connected in series in a same direction;

a second bridge arm, comprising a first conduction element and a second conduction element that are connected in series in a same direction, wherein the second bridge arm is connected in parallel to the first bridge arm;

an input inductance element, coupled to a first center point of the first bridge arm, wherein the input inductance element and a second center point of the second bridge arm are configured to be coupled to a power supply;

a main capacitor element and an magnetizing inductance element, wherein the main capacitor element and the magnetizing inductance element are connected in series and connected in parallel to the second bridge arm; and a voltage transformation element, wherein a primary side of the voltage transformation element is connected in parallel to the magnetizing inductance element.

2. The conversion system according to claim 1, wherein the first conduction element comprises a first diode, the second conduction element comprises a second diode, a cathode of the first diode is coupled to a first end of the first switch and the main capacitor element, an anode of the first diode is coupled to a cathode of the second diode, an anode of the second diode is coupled to a second end of the second switch and the magnetizing inductance element, and a second end of the first switch is coupled to a first end of the second switch.

3. The conversion system according to claim 1, comprising:

a control unit, configured to: (a) generate a first duty cycle based on an output voltage of the conversion unit; (b) control, based on the first duty cycle, the first switch and the second switch to be simultaneously turned on in an interval within a switching interval; and (c) prolong turn-on of one of the first switch and the second switch according to a polarity of an input voltage generated by the power supply until a stop condition is met.

4. The conversion system according to claim 3, wherein the control unit comprises a polarity detection unit, configured to detect and output the polarity of the input voltage.

5. The conversion system according to claim 3, wherein the control unit comprises a second duty cycle calculation unit and a switch control unit; and step (c) comprises: (c1) calculating, by the second duty cycle calculation unit, a second duty cycle based on the first duty cycle, the input voltage received by the input inductance element and the second center point, the output voltage, a main capacitor voltage on the main capacitor element, and a turns ratio of the voltage transformation element; and (c2) executing, by the switch control unit: prolonging the turn-on of the first switch in response to the input voltage being in a positive half cycle until a prolonged turn-on time is equal to the second duty cycle multiplied by a switching cycle; and prolonging the turn-on of the second switch in response to the input voltage being in a negative half cycle until the prolonged turn-on time is equal to the second duty cycle multiplied by the switching cycle.

6. The conversion system according to claim 5, wherein the calculating the second duty cycle comprises: calculating a first product of the first duty cycle and an absolute value of the input voltage; calculating a sum of the main capacitor voltage, a second product of the output voltage and the turns ratio of the voltage transformation element, and a negative value of the absolute value of the input voltage; and dividing the first product by the sum to obtain the second duty cycle.

7. The conversion system according to claim 3, wherein the control unit comprises a first duty cycle calculation unit, and step (a) comprises: executing, by the first duty cycle calculation unit: receiving the output voltage of the conversion unit, and obtaining a voltage error between a reference voltage and the output voltage of the conversion unit; and converting the voltage error into the first duty cycle based on a control algorithm.

8. The conversion system according to claim 7, wherein the control algorithm is a proportional-integral algorithm.

9. The conversion system according to claim 3, comprising a current sense resistor, wherein a first end of the current sense resistor is coupled to the second conduction element, and a second end of the current sense resistor is coupled to the magnetizing inductance element; the control unit comprises a switch control unit; and step (c) comprises: (c1) detecting, by the current sense resistor, a current value of a detection current flowing through the current sense resistor; and (c2) executing, by the switch control unit: prolonging the turn-on of the first switch in response to the input voltage being in a positive half cycle until it is detected that the current value of the detection current is 0; and prolonging the turn-on of the second switch in response to the input voltage being in a negative half cycle until it is detected that the current value of the detection current is 0.

10. The conversion system according to claim 3, wherein the control unit comprises a switch control unit; the first switch and the second switch are NMOSs; and step (c) comprises: executing, by the switch control unit: prolonging the turn-on of the first switch in response to the input voltage being in a positive half cycle until it is detected that a voltage between a source and a drain of the first switch reaches a first turn-off voltage; and prolonging the turn-on of the second switch in response to the input voltage being in a negative half cycle until it is detected that a voltage between a source and a drain of the second switch reaches a second turn-off voltage.

11. The conversion system according to claim 3, comprising an input inductance detection element, configured to detect an input inductance element current flowing through the input inductance element, wherein the control unit comprises a switch control unit; and step (c) comprises: (c1) detecting, by the input inductance detection element, a current value of the input inductance element current; and (c2) executing, by the switch control unit: prolonging the turn-on of the first switch in response to the input voltage being in a positive half cycle until it is detected that the current value of the input inductance element current is 0; and prolonging the turn-on of the second switch in response to the input voltage being in a negative half cycle until it is detected that the current value of the input inductance element current is 0.

12. A conversion method, applicable to a conversion system, wherein the conversion system comprises: a conversion unit, comprising: a first bridge arm, comprising a first switch and a second switch that are connected in series in a same direction; a second bridge arm, comprising a first conduction element and a second conduction element that are connected in series in a same direction, wherein the second bridge arm is connected in parallel to the first bridge arm; an input inductance element, coupled to a first center point of the first bridge arm, wherein the input inductance element and a second center point of the second bridge arm are configured to be coupled to a power supply; a main capacitor element and an magnetizing inductance element, wherein the main capacitor element and the magnetizing inductance element are connected in series and connected in parallel to the second bridge arm; and a voltage transformation element, wherein a primary side of the voltage transformation element is connected in parallel to the magnetizing inductance element; and a control unit, wherein the conversion method comprises the following steps performed by the control unit:

(a) generating a first duty cycle based on an output voltage of the conversion unit;
(b) controlling, based on the first duty cycle, the first switch and the second switch to be simultaneously turned on in an interval within a switching interval; and
(c) prolonging turn-on of one of the first switch and the second switch according to a polarity of an input voltage generated by the power supply until a stop condition is met.

13. The conversion method according to claim 12, wherein the control unit comprises a polarity detection unit, and the conversion method comprises: detecting and outputting, by the polarity detection unit, the polarity of the input voltage.

14. The conversion method according to claim 12, wherein the control unit comprises a second duty cycle calculation unit and a switch control unit; and step (c) comprises: (c1) calculating, by the second duty cycle calculation unit, a second duty cycle based on the first duty cycle, the input voltage received by the input inductance element and the second center point, the output voltage, a main capacitor voltage on the main capacitor element, and a turns ratio of the voltage transformation element; and (c2) executing, by the switch control unit: prolonging the turn-on of the first switch in response to the input voltage being in a positive half cycle until a prolonged turn-on time is equal to the second duty cycle multiplied by a switching cycle; and prolonging the turn-on of the second switch in response to the input voltage being in a negative half cycle until the prolonged turn-on time is equal to the second duty cycle multiplied by the switching cycle.

15. The conversion method according to claim 14, wherein step (c1) comprises: calculating a first product of the first duty cycle and an absolute value of the input voltage; calculating a sum of the main capacitor voltage, a second product of the output voltage and the turns ratio of the voltage transformation element, and a negative value of the absolute value of the input voltage; and dividing the first product by the sum to obtain the second duty cycle.

16. The conversion method according to claim 12, wherein the control unit comprises a first duty cycle calculation unit, and step (a) comprises: executing, by the first duty cycle calculation unit: receiving the output voltage of the conversion unit, and obtaining a voltage error between a reference voltage and the output voltage of the conversion unit; and converting the voltage error into the first duty cycle based on a control algorithm.

17. The conversion method according to claim 16, wherein the control algorithm is a proportional-integral algorithm.

18. The conversion method according to claim 12, wherein the conversion system comprises a current sense resistor, a first end of the current sense resistor is coupled to the second conduction element, and a second end of the current sense resistor is coupled to the magnetizing inductance element; the control unit comprises a switch control unit; and step (c) comprises: (c1) detecting, by the current sense resistor, a current value of a detection current flowing through the current sense resistor; and (c2) executing, by the switch control unit: prolonging the turn-on of the first switch in response to the input voltage being in a positive half cycle until it is detected that the current value of the detection current is 0; and prolonging the turn-on of the second switch in response to the input voltage being in a negative half cycle until it is detected that the current value of the detection current is 0.

19. The conversion method according to claim 12, wherein the control unit comprises a switch control unit; the first switch and the second switch are NMOSs; and step (c) comprises: executing, by the switch control unit: prolonging the turn-on of the first switch in response to the input voltage being in a positive half cycle until it is detected that a voltage between a source and a drain of the first switch reaches a first turn-off voltage; and prolonging the turn-on of the second switch in response to the input voltage being in a negative half cycle until it is detected that a voltage between a source and a drain of the second switch reaches a second turn-off voltage.

20. The conversion method according to claim 12, wherein the conversion system comprises an input inductance detection element, configured to detect an input inductance element current flowing through the input inductance element; the control unit comprises a switch control unit; and step (c) comprises: (c1) detecting, by the input inductance detection element, a current value of the input inductance element current; and (c2) executing, by the switch control unit: prolonging the turn-on of the first switch in response to the input voltage being in a positive half cycle until it is detected that the current value of the input inductance element current is 0; and prolonging the turn-on of the second switch in response to the input voltage being in a negative half cycle until it is detected that the current value of the input inductance element current is 0.

* * * * *